US011101948B2

(12) United States Patent
Dou et al.

(10) Patent No.: US 11,101,948 B2
(45) Date of Patent: Aug. 24, 2021

(54) DATA TRANSMISSION METHOD, TERMINAL, AND NETWORK DEVICE

(71) Applicant: Huawei Technologies Co., Ltd., Shenzhen (CN)

(72) Inventors: Shengyue Dou, Shanghai (CN); Ting Wang, Shanghai (CN); Yuanjie Li, Shanghai (CN); Yi Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 106 days.

(21) Appl. No.: 16/673,265

(22) Filed: Nov. 4, 2019

(65) Prior Publication Data
US 2020/0067665 A1    Feb. 27, 2020

Related U.S. Application Data

(63) Continuation of application No. PCT/CN2018/085598, filed on May 4, 2018.

(30) Foreign Application Priority Data

May 5, 2017    (CN) .......................... 201710314178.7

(51) Int. Cl.
*H04L 5/00* (2006.01)
*H04B 7/06* (2006.01)
(Continued)

(52) U.S. Cl.
CPC ............. *H04L 5/0035* (2013.01); *H04B 7/06* (2013.01); *H04L 5/0094* (2013.01);
(Continued)

(58) Field of Classification Search
CPC ....... H04B 7/06; H04L 5/0035; H04L 5/0094; H04W 72/042; H04W 72/0446; H04W 72/0453; H04W 72/1226; H04W 72/1289
See application file for complete search history.

(56) References Cited

U.S. PATENT DOCUMENTS 10,326,575 B2 * 6/2019 Davydov .............. H04L 5/0048
10,812,231 B2 * 10/2020 Chen .................... H04B 7/0486
(Continued)

FOREIGN PATENT DOCUMENTS

CN    104704750 A    6/2015
CN    104081683 B    3/2018
(Continued)

OTHER PUBLICATIONS

Huawei et al., "Details of QCL assumptions and related RS design considerations," 3GPP TSG RAN WG1 Meeting #88bis, R1-1704239, Spokane, WA, USA, Apr. 3-7, 2017, 5 pages.
(Continued)

*Primary Examiner* — Eric Nowlin
(74) *Attorney, Agent, or Firm* — Slater Matsil, LLP

(57) ABSTRACT

This application provides a data transmission method, a terminal, and a network device. The method includes: receiving, by a terminal, first indication information and second indication information, where the first indication information is used to indicate at least one group of resources, the at least one group of resources corresponds to at least one group of antenna ports or at least one group of codewords, the second indication information is used to indicate the at least one group of codewords and QCL configuration information of the at least one group of antenna ports, or the second indication information is used to indicate the at least one group of antenna ports and QCL configuration information of the at least one group of antenna ports; and determining, by the terminal, the at least
(Continued)

one group of resources based on the first indication information and the second indication information.

20 Claims, 6 Drawing Sheets

(51) Int. Cl.
*H04W 72/04* (2009.01)
*H04W 72/12* (2009.01)

(52) U.S. Cl.
CPC ..... *H04W 72/042* (2013.01); *H04W 72/1226* (2013.01); *H04W 72/1289* (2013.01); *H04W 72/0446* (2013.01); *H04W 72/0453* (2013.01)

(56) References Cited

U.S. PATENT DOCUMENTS

| | | | | |
|---|---|---|---|---|
| 2014/0192734 | A1* | 7/2014 | Ng | H04L 5/0035 370/329 |
| 2016/0248561 | A1* | 8/2016 | Davydov | H04B 7/024 |
| 2018/0212727 | A1* | 7/2018 | Davydov | H04L 5/0048 |
| 2019/0159209 | A1* | 5/2019 | Xiao | H04W 72/0466 |
| 2019/0319757 | A1* | 10/2019 | Manolakos | H04B 7/0689 |
| 2020/0036555 | A1* | 1/2020 | Davydov | H04L 5/0094 |
| 2020/0059277 | A1* | 2/2020 | Su | H04B 7/0473 |

FOREIGN PATENT DOCUMENTS

| | | | | |
|---|---|---|---|---|
| CN | 107888236 A | * | 4/2018 | ............ H04B 7/024 |
| WO | WO-2017095470 A1 | * | 6/2017 | ........... H04L 5/0053 |

OTHER PUBLICATIONS

Intel Corporation "Control signalling enhancement for NC-JT," 3GPP TSG RAN WG1 Meeting #88bis, R1-1704691, Apr. 3-7, 2017, 2 pages.

3rd Generation Partnership Project;Technical Specification Group Radio Access Network; Evolved Universal Terrestrial Radio Access (E-UTRA); Physical layer procedures (Release 8), 3GPP TS 36.213 V8.8.0 (Sep. 19, 2009), 77 pages.

3rd Generation Partnership Project; Technical Specification Group Radio Access Network; Evolved Universal Terrestrial Radio Access (E-UTRA); Physical layer procedures (Release 13), 3GPP TS 36.213 V13.5.0 (Mar. 2017), 386 pages.

* cited by examiner

| Subset 0 (p=0) | VRB 0 | VRB 1 | VRB 4 | VRB 5 | VRB 8 | VRB 9 | VRB 12 | VRB 13 | VRB 16 | VRB 17 | VRB 20 | VRB 21 | VRB 24 |
|---|---|---|---|---|---|---|---|---|---|---|---|---|---|
| Subset 1 (p=1) | VRB 2 | VRB 3 | VRB 6 | VRB 7 | VRB 10 | VRB 11 | VRB 14 | VRB 15 | VRB 18 | VRB 19 | VRB 22 | VRB 23 | |

REG 0, REG 2, REG 4, REG 6, REG 8, REG 10, REG 12

FIG. 5

DATA TRANSMISSION METHOD, TERMINAL, AND NETWORK DEVICE

CROSS-REFERENCE TO RELATED APPLICATIONS

This application is a continuation of International Application No. PCT/CN2018/085598, filed on May 4, 2018, which claims priority to Chinese Patent Application No. 201710314178.7, filed on May 5, 2017. The disclosures of the aforementioned applications are hereby incorporated by reference in their entireties.

TECHNICAL FIELD

This application relates to the communications field, and more specifically, to a data transmission method, a terminal, and a network device.

BACKGROUND

Coordinated multipoint transmission (CoMP) is a method for resolving an inter-cell interference problem and improving a throughput of a cell edge terminal. In CoMP technologies, a plurality of adjacent cells may jointly perform processing or coordinate an edge user, to avoid interference and improve a throughput of the edge user. Downlink CoMP technologies mainly include joint transmission (JT), coordinated scheduling and beamforming (CS/CB), dynamic point selection/dynamic point blanking (DPS/DPB), and the like. In coordinated transmission modes, such as the DPS/DPB or the CS/CB, a single network device serves a terminal, and in the JT, a plurality of coordinated network devices serve a terminal.

In a current technology, a network device indicates a resource of the network device by using a resource block assignment (RA) field in downlink control information (DCI), and the indicated resource may be used to transmit downlink data. Because one piece of DCI can indicate a resource of only one network device, a design of the DCI can be applied only to a case in which a single-point network device serves UE, for example, the DPS, the DPB, and the CS/CB in a coordinated scenario. However, when a plurality of coordinated network devices serve UE, for example, in the JT, the current technology cannot support a requirement of scheduling a resource by each of the plurality of network devices.

SUMMARY

This application provides a data transmission method, a terminal, and a network device, to meet a requirement of scheduling resources of at least one group of antenna ports by a network device.

According to a first aspect, a data transmission method is provided, and the method includes: receiving, by a terminal, first indication information and second indication information, where the first indication information is used to indicate at least one group of resources, the at least one group of resources corresponds to at least one group of antenna ports or at least one group of codewords, each group of antenna ports includes at least one antenna port, the second indication information is used to indicate the at least one group of codewords and quasi-co-location (QCL) configuration information of the at least one group of antenna ports, or the second indication information is used to indicate the at least one group of antenna ports and QCL configuration information of the at least one group of antenna ports, one group of antenna ports or one group of codewords corresponds to one group of QCL configuration information, and the QCL configuration information is used to determine a QCL relationship between antenna ports; and determining, by the terminal, the at least one group of resources based on the first indication information and the second indication information.

According to the data transmission method in an embodiment of this application, all groups of resources can be determined based on the first indication information and the second indication information, and a requirement of scheduling resources of the at least one group of antenna ports by a network device can be met.

In a possible implementation, the receiving, by a terminal, first indication information and second indication information includes: receiving, by the terminal, downlink control information (DCI), where the DCI includes the first indication information and the second indication information.

In a possible implementation, the receiving, by a terminal, second indication information includes: receiving, by the terminal, higher layer signaling sent by the network device, where the higher layer signaling includes the second indication information.

In a possible implementation, the first indication information is information that is in the downlink control information (DCI) and that is used to indicate a resource block assignment (RA) field.

Information in a resource block assignment (RA) field in the DCI indicates the at least one group of resources, to avoid scheduling the at least one group of resources by using a plurality of pieces of DCI, so that signaling overheads can be reduced.

In a possible implementation, the determining, by the terminal, the at least one group of resources based on the first indication information and the second indication information includes: determining, by the terminal, a first scheduling unit of the at least one group of resources based on the QCL configuration information indicated by the second indication information; and determining, by the terminal, the at least one group of resources based on the first scheduling unit and the first indication information.

In a possible implementation, the second indication information is carried in a PDSCH resource mapping and quasi-co-location indicator (PQI) field in the DCI.

The PQI field in the current technology carries the second indication information, to avoid introducing new signaling overheads, so that system performance can be improved.

In a possible implementation, the determining, by the terminal, a first scheduling unit of the at least one group of resources based on the QCL configuration information indicated by the second indication information includes: determining, by the terminal based on a quantity k of groups of the QCL configuration information indicated by the second indication information, that the first scheduling unit is k times a second scheduling unit, where k is an integer greater than or equal to 1, and the k groups of the QCL configuration information are different from each other.

It should be understood that the k groups of the QCL configuration information are different from each other, which means that parameters included in each group of QCL configuration information are of a same category, but values of parameters of a same parameter category in each group of QCL parameters are different.

In a possible implementation, the second scheduling unit is a resource block group (RBG) or a resource block (RB), and k is an integer greater than or equal to 1.

It should be understood that the second scheduling unit is not limited in this embodiment of this application, and a basic time unit may be, for example, a second scheduling unit defined in a new radio access technology (NR) system. In a possible implementation, the determining, by the terminal, the at least one group of resources based on the first indication information and the second indication information includes: determining, by the terminal, a resource scheduling bandwidth of the at least one group of resources based on the QCL configuration information indicated by the second indication information; and determining, by the terminal, the at least one group of resources based on the resource scheduling bandwidth and the first indication information.

In a possible implementation, the determining, by the terminal, a resource scheduling bandwidth of the at least one group of resources based on the QCL configuration information indicated by the second indication information includes: determining, by the terminal, the resource scheduling bandwidth based on a quantity k of groups of the QCL configuration information indicated by the second indication information, where k is an integer greater than or equal to 1.

In a possible implementation, the determining, by the terminal, the resource scheduling bandwidth based on a quantity k of groups of the QCL configuration information indicated by the second indication information includes: determining, by the terminal, based on the quantity k of groups, that the resource scheduling bandwidth is $\lceil N_{RB}^{DL}/k \rceil$, where $N_{RB}^{DL}$ is a downlink system bandwidth or a bandwidth part bandwidth part, and the k groups of the QCL configuration information are different from each other.

In a possible implementation, the determining, by the terminal, a resource scheduling bandwidth based on the QCL configuration information indicated by the second indication information includes: when the QCL configuration information indicated by the second indication information is first QCL configuration information, determining, by the terminal, that the resource scheduling bandwidth is the downlink system bandwidth $N_{RB}^{DL}$; and when the k groups of the QCL configuration information indicated by the second indication information are second QCL configuration information, determining, by the terminal, that the resource scheduling bandwidth is $\lceil N_{RB}^{DL}/k \rceil$, where k is an integer greater than or equal to 1.

It should be understood that the first QCL configuration information is specified, for example, preset in a system. The first QCL configuration information may include one or more groups of QCL configuration information. The second QCL configuration information may be QCL configuration information other than the first QCL configuration information.

According to a second aspect, a data transmission method is provided, and the method includes: determining, by a network device, first indication information and second indication information, where the first indication information is used to indicate at least one group of resources, the at least one group of resources corresponds to at least one group of antenna ports or at least one group of codewords, each group of antenna ports includes at least one antenna port, the second indication information is used to indicate the at least one group of codewords and quasi-co-location (QCL) configuration information of the at least one group of antenna ports, or the second indication information is used to indicate the at least one group of antenna ports and QCL configuration information of the at least one group of antenna ports, one group of antenna ports or one group of codewords corresponds to one group of QCL configuration information, and the QCL configuration information is used to determine a QCL relationship between antenna ports; and sending, by the network device, the first indication information and the second indication information to a terminal.

According to the data transmission method in an embodiment of this application, all groups of resources can be determined based on the first indication information and the second indication information, and a requirement of scheduling resources of the at least one group of antenna ports by the network device can be met.

In a possible implementation, the sending, by the network device, the first indication information and the second indication information to a terminal includes: sending, by the network device, downlink control information (DCI) to the terminal, where the DCI includes the first indication information and the second indication information.

In a possible implementation, the sending, by the network device, the second indication information to a terminal includes: sending, by the network device, higher layer signaling to the terminal, where the higher layer signaling includes the second indication information.

In a possible implementation, the first indication information is information that is in the downlink control information (DCI) and that is used to indicate a resource block assignment (RA) field.

Information in a resource block assignment (RA) field in the DCI indicates the at least one group of resources, to avoid scheduling the at least one group of resources by using a plurality of pieces of DCI, so that signaling overheads can be reduced.

In a possible implementation, the QCL configuration information indicated by the second indication information is used to determine a first scheduling unit of the at least one group of resources, and the first scheduling unit is used to determine the at least one group of resources.

In a possible implementation, the second indication information is carried in a PQI field in the DCI.

The PQI field in the current technology carries the second indication information, to avoid introducing new signaling overheads, so that system performance can be improved.

In a possible implementation, the first scheduling unit is k times the second scheduling unit, k is a quantity of groups of the QCL configuration information indicated by the second indication information, k is an integer greater than or equal to 1, and the k groups of the QCL configuration information are different from each other.

It should be understood that the k groups of the QCL configuration information are different from each other, which means that parameters included in each group of QCL configuration information are of a same category, but values of parameters of a same parameter category in each group of QCL parameters are different.

In a possible implementation, the second scheduling unit is a resource block group (RBG) or a resource block (RB), and k is an integer greater than or equal to 1.

It should be understood that the second scheduling unit is not limited in this embodiment of this application, and a basic time unit may be, for example, a second scheduling unit defined in a new radio access technology (NR) system or another system.

In a possible implementation, the QCL configuration information indicated by the second indication information is used to determine a resource scheduling bandwidth of the at least one group of resources, and the resource scheduling bandwidth is used to determine the at least one group of resources.

In a possible implementation, the resource scheduling bandwidth is determined based on the quantity k of groups of the QCL configuration information indicated by the second indication information, and k is an integer greater than or equal to 1.

In a possible implementation, the resource scheduling bandwidth is $\lceil N_{RB}^{DL}/k \rceil$, $N_{RB}^{DL}$ is a downlink system bandwidth or a bandwidth part bandwidth part, and the k groups of the QCL configuration information are different from each other.

In a possible implementation, when the QCL configuration information indicated by the second indication information is first QCL configuration information, the resource scheduling bandwidth is the downlink system bandwidth $N_{RB}^{DK}$; and when the k groups of the QCL configuration information indicated by the second indication information are second QCL configuration information, the resource scheduling bandwidth is $\lceil N_{RB}^{DL}/k \rceil$, and k is an integer greater than or equal to 1.

It should be understood that the first QCL configuration information is specified, for example, preset in a system. The first QCL configuration information may include one or more groups of QCL configuration information. The second QCL configuration information may be QCL configuration information other than the first QCL configuration information.

According to a third aspect, a data transmission method is provided, and the method includes: receiving, by a terminal, downlink control information (DCI) sent by a network device, where the DCI is used to indicate a plurality of groups of resources, the plurality of groups of resources one-to-one correspond to a plurality of groups of antenna ports or a plurality of groups of codewords, and each group of antenna ports includes at least one antenna port; determining, by the terminal, a first scheduling unit or a resource scheduling bandwidth of the plurality of groups of resources; and determining, by the terminal, the plurality of groups of resources based on the DCI and the first scheduling unit, or based on the DCI and the resource scheduling bandwidth.

According to the data transmission method in an embodiment of this application, the terminal can determine the plurality of groups of resources based on the DCI and the first scheduling unit, or based on the DCI and the resource scheduling bandwidth, thereby meeting a requirement that each of a plurality of network devices needs to schedule resources in the current technology. In addition, the plurality of groups of resources are scheduled by using one piece of DCI, to reduce signaling overheads. In a possible implementation, the DCI is further used to indicate the plurality of groups of resources or the plurality of groups of codewords corresponding to the plurality of groups of antenna ports.

Therefore, the terminal can determine, based on the DCI, the antenna ends or codewords that respectively correspond to the plurality of groups of resources, so that accuracy of demodulating data by the terminal and network performance can be improved.

In a possible implementation, bit information in an RA field in the DCI indicates the plurality of groups of scheduled resources.

One RA field indicates the plurality of groups of resources, to further reduce signaling overheads and improve network performance.

In a possible implementation, the determining, by the terminal, a first scheduling unit or a resource scheduling bandwidth of the plurality of groups of resources includes: determining, by the terminal, the first scheduling unit or the resource scheduling bandwidth based on QCL indication information, where the QCL indication information is used to indicate that a current transmission manner is non-coherent JT (NCJT), or the QCL indication information is used to determine a group quantity of the plurality of groups of antenna ports.

Optionally, a quantity of network devices participating in the NCJT transmission may be predefined or preconfigured.

In a possible implementation, the QCL indication information is information in a PQI field in the DCI.

The PQI field in the current technology carries the QCL indication information, to avoid introducing new signaling overheads, so that system performance can be improved.

In a possible implementation, the determining, by the terminal, a first scheduling unit of the plurality of groups of resources includes: determining, by the terminal based on the QCL indication information, that the first scheduling unit is N times a second scheduling unit, where N is an integer greater than or equal to 1, and N is a group quantity of the plurality of groups of antenna ports.

Optionally, the second scheduling unit is a resource block group RBG or a resource block RB, and k is an integer greater than or equal to 1.

It should be understood that the second scheduling unit is not limited in this embodiment of this application, and a basic time unit may be, for example, a second scheduling unit defined in an NR system or another system.

In a possible implementation, the determining, by the terminal, a resource scheduling bandwidth of the plurality of groups of resources includes: determining, by the terminal based on the QCL indication information, that the resource scheduling bandwidth $N_{TRP}$ is $\lceil N_{RB}^{DL}/N \rceil$, where $N_{RB}^{DL}$ is a downlink system bandwidth or a bandwidth part bandwidth part. In other words, a resource scheduling bandwidth of each network device is $\lceil N_{RB}^{DL}/N \rceil$, and N is a group quantity of the plurality of groups of antenna ports.

According to a fourth aspect, a data transmission method is provided, and the method includes: determining, by a network device, a plurality of groups of resources based on a first scheduling unit or a resource scheduling bandwidth of the plurality of groups of resources, where the plurality of groups of resources one-to-one correspond to a plurality of groups of antenna ports or a plurality of groups of codewords, and each group of antenna ports includes at least one antenna port; and sending, by the network device, downlink control information (DCI) to a terminal, where the DCI is used by the terminal to determine the plurality of groups of resources.

According to the data transmission method in an embodiment of this application, the terminal can determine the plurality of groups of resources based on the DCI and the first scheduling unit, or based on the DCI and the resource scheduling bandwidth, thereby meeting a requirement that each of a plurality of network devices needs to schedule resources in the current technology. In addition, the plurality of groups of resources are scheduled by using one piece of DCI, to reduce signaling overheads.

In a possible implementation, the DCI is further used to indicate the plurality of groups of resources or the plurality of groups of codewords corresponding to the plurality of groups of antenna ports.

Therefore, the terminal can determine, based on the DCI, the antenna ends or codewords that respectively correspond to the plurality of groups of resources, so that accuracy of demodulating data by the terminal and network performance can be improved.

In a possible implementation, bit information in an RA field in the DCI indicates the plurality of groups of scheduled resources.

One RA field indicates the plurality of groups of resources, to further reduce signaling overheads and improve network performance.

In a possible implementation, the method further includes: sending, by the network device, QCL indication information to the terminal, where the QCL indication information is used by the terminal to determine the first scheduling unit or the resource scheduling bandwidth, and the QCL indication information is used to indicate that a current transmission manner is NCJT, or the QCL indication information is used to determine a group quantity of the plurality of groups of antenna ports.

Optionally, a quantity of network devices participating in the NCJT transmission may be predefined or preconfigured.

In a possible implementation, the QCL indication information is information in a PQI field in the DCI.

The PQI field in the current technology carries the QCL indication information, to avoid introducing new signaling overheads, so that system performance can be improved.

In a possible implementation, the first scheduling unit is N times the second scheduling unit, N is an integer greater than or equal to 1, and N is a group quantity of the plurality of groups of antenna ports.

Optionally, the second scheduling unit is a resource block group RBG or a resource block RB, and k is an integer greater than or equal to 1.

It should be understood that the second scheduling unit is not limited in this embodiment of this application, and a basic time unit may be, for example, a second scheduling unit defined in an NR system or another system.

In a possible implementation, the resource scheduling bandwidth $N_{TRP}$ is $\lceil N_{RB}^{DL}/N \rceil$, and $N_{RB}^{DL}$ is a downlink system bandwidth or a bandwidth part bandwidth part. In other words, a resource scheduling bandwidth of each network device is $\lceil N_{RB}^{DL}/N \rceil$, and N is a group quantity of the plurality of groups of antenna ports.

According to a fifth aspect, a terminal is provided, and is configured to perform the method in the first aspect or any possible implementation of the first aspect. Specifically, the terminal includes units configured to perform the method in the first aspect or any possible implementation of the first aspect, or the terminal includes units configured to perform the method in the third aspect or any possible implementation of the third aspect.

According to a sixth aspect, a network device is provided, configured to perform the method in the second aspect or any possible implementation of the second aspect. Specifically, the network device includes units configured to perform the method in the second aspect or any possible implementation of the second aspect, or the network device includes units configured to perform the method in the fourth aspect or any possible implementation of the fourth aspect.

According to a seventh aspect, a terminal is provided, and the terminal includes a memory and a processor. The memory is configured to store a computer program, and the processor is configured to invoke and run the computer program in the memory, so that the transmit end performs the method in the first aspect or any possible implementation of the first aspect, or performs the method in the third aspect or any possible implementation of the third aspect.

According to an eighth aspect, a network device is provided, and the network device includes a memory and a processor. The memory is configured to store a computer program, and the processor is configured to invoke and run the computer program in the memory, so that the receive end performs the method in the second aspect or any possible implementation of the second aspect, or the method in the fourth aspect or any possible implementation of the fourth aspect.

According to a ninth aspect, a computer-readable storage medium is provided, configured to store a computer program. The computer program includes an instruction used to perform the method in the foregoing aspects and any possible implementation of the foregoing aspects.

According to a tenth aspect, a computer program product including an instruction is provided. When the instruction runs on a computer, the computer is enabled to perform the method in the foregoing aspects or any possible implementation of the foregoing aspects.

According to an eleventh aspect, this application provides a chip system. The chip system includes a processor, configured to support a data sending device in implementing functions in the foregoing aspects, for example, generating or processing data and/or information in the foregoing methods. In a possible design, the chip system further includes a memory, and the memory is configured to store a program instruction and data that are necessary for the data sending device. The chip system may include a chip, or may include a chip and another discrete device.

According to a twelfth aspect, this application provides a chip system. The chip system includes a processor, configured to support a data receiving device in implementing functions in the foregoing aspects, for example, receiving or processing data and/or information in the foregoing methods. In a possible design, the chip system further includes a memory, and the memory is configured to store a program instruction and data that are necessary for the data receiving device. The chip system may include a chip, or may include a chip and another discrete device.

BRIEF DESCRIPTION OF THE DRAWINGS

FIG. 5 is a schematic diagram of resource grouping according to an embodiment of this application;

DETAILED DESCRIPTION OF ILLUSTRATIVE EMBODIMENTS

The following describes the technical solutions of this application with reference to the accompanying drawings.

Figure 1:
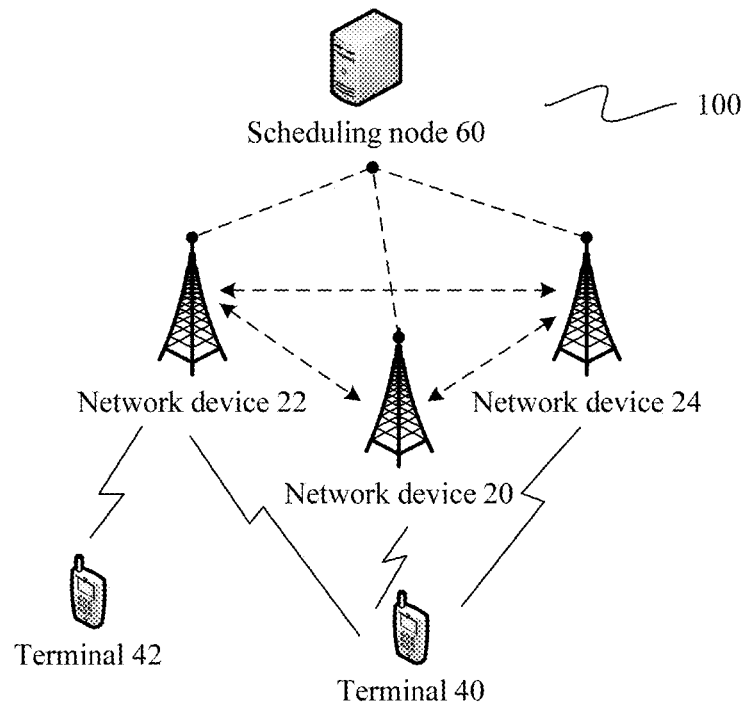
FIG. 1 is a schematic diagram of a system of a transmission method applied to this application.

As shown in FIG. 1, an embodiment of this application provides a communications system 100. The communications system 100 includes at least two network devices and at least one terminal. The terminal accesses to the network device through a wireless interface for communication, or may communicate with another terminal, for example, communication in a device to device (D2D) scenario or a machine to machine (M2M) scenario. The network device may communicate with the terminal, or may communicate with another network device, for example, communication between a macro base station and an access point. In the communications system 100, one network device may provide a communications service for one or more terminals. For example, a network device 22 may provide the communications service for a terminal 42. One terminal may also communicate with a plurality of network devices on a same carrier. For example, a terminal 40 may simultaneously receive, on a same time-frequency resource or on different time-frequency resources, downlink data transmitted by a network device 20, the network device 22, and a network device 24, that is, at least two network devices transmit the downlink data to the terminal by using a CoMP technology. The CoMP technology may be implemented by using a technology such as space diversity and/or spatial multiplexing. This is not limited in this application.

In a scenario in which the CoMP technology is applied, a network device that provides a terminal with a service such as a radio resource control (RRC) connection, non-access stratum (NAS) mobility management, and security input by using a wireless air interface protocol is defined as a service network device of the terminal, and one or more other network devices that send downlink data to the terminal are defined as coordinated network devices of the terminal. It should be understood that the service network device may also send downlink data to the terminal. The service network device may communicate with the coordinated network device, and a plurality of coordinated network devices may communicate with each other, for example, transmit a control message. In the communications system 100 provided in the embodiments of this application, the plurality of network devices that transmit downlink data to the terminal by using the CoMP technology may be different transmission points of a same device, for example, a plurality of radio units (RU) of a distributed base station, or may be a plurality of independent network devices, for example, a plurality of base stations, or may be a combination of the foregoing two cases. This is not limited in this application.

Optionally, the plurality of network devices may be controlled and/or scheduled by a scheduling node. For example, in FIG. 1, the network device 20, the network device 22, and the network device 24 may be all controlled and/or scheduled by a scheduling node 60, and the scheduling node may send information such as the control message to the plurality of network devices. Optionally, a function of the scheduling node may alternatively be completed by one or more network devices. For example, the network device 20 may implement the function of the scheduling node, to send the control message to the network device 22 and/or the network device 24. It should be noted that the scheduling node may be an independent physical device (for example, the scheduling node 60 shown in FIG. 1), or may be a software function module and/or a hardware function module integrated into the network device. For example, in FIG. 1, the network device 20 may implement the function of the scheduling node. In this case, the network device 20 may schedule and manage all resources together, and so on based on information sent by another network device and information obtained and maintained by the network device 20. Certainly, another network device may implement the function of the scheduling node. This is not limited in this application.

It should be understood that the communications system 100 may be various communications systems, such as a global system for mobile communications (GSM), a code division multiple access (CDMA) system, a wideband code division multiple access (WCDMA) system, a general packet radio service (GPRS), a long term evolution (LTE) system, a long term evolution advanced (LTE-A) system, a universal mobile telecommunication system (UMTS), a 5G (or referred to as a new radio access technology (NR)) system, and the technical solutions provided in the embodiments of this application is applicable to a communications system with the CoMP technology applied. The system architecture and the service scenario described in the embodiments of this application are intended to describe the technical solutions in the embodiments of this application more clearly, and shall not constitute a limitation on the technical solutions provided in the embodiments of this application. A person of ordinary skill in the art may know that: With an evolution of a network architecture and emergence of a new service scenario, the technical solutions provided in the embodiments of this application are also applicable to similar technical problems.

The network device in this application may be a cell (cell), a node (for example, a base station or a relay node) corresponding to the cell, a remote radio head (RRH), a radio remote unit (RRU), an antenna port, a transmission point (TP), or the like. The base station may be a base transceiver station (BTS) in the GSM system or the CDMA system, a NodeB (NodeB) in the WCDMA system, an evolved NodeB (evolutional NodeB, eNB or eNodeB) in the LTE system, a transmission reception point (TRP) in the NR system, a TP, one antenna panel or a group (including a plurality of antenna panels) of antenna panels of a base station in the 5G system, or the like. This is not specifically limited in the embodiments of this application.

The network device may be determined based on a cell identity, a base station identity, an antenna port index or an antenna port number, a pilot information identity, or the like.

In addition, the network device in the embodiments of this application may use a CU-DU architecture. The network device performing the method in the embodiments of this application, for example, the service network device or the coordinated network device, may be a centralized unit (CU), or may be a distributed unit (DU). The CU may also be referred to as a central unit or a control unit.

The terminal in this application may be mobile or fixed. The terminal may communicate with one or more core networks through a radio access network (RAN). The terminal may be referred to as a terminal device, an access terminal, user equipment (UE), a subscriber unit, a subscriber station, a mobile station, a mobile station, a remote station, a remote terminal, a mobile device, a user terminal, a wireless communications device, a user agent, or a user apparatus. The terminal may be a cellular phone, a cordless phone, a session initiation protocol (SIP) phone, a wireless local loop (WLL) station, a personal digital assistant (PDA), a handheld device with a wireless communication function, a computing device, or another processing device connected to a wireless modem, a vehicle-mounted device, a wearable device, or the like.

It should be noted that the communications system 100 shown in FIG. 1 is merely a schematic diagram of a system applicable to this application, and the communications system 100 shown in FIG. 1 should not constitute any limitation on a communications system that is applied to this application. As shown in FIG. 1, a quantity and structures of network devices included in the communications system 100, a quantity and distribution of different network devices and terminals communicating with the network devices, a quantity of network devices that send data to a same terminal in a same period and on a same carrier by using the CoMP technology, and a quantity and types of terminals are merely examples. These are not limited in the embodiment of this application. In addition, in the communications system 100 shown in FIG. 1, although the network device 20, the network device 22, the network device 24, and a plurality of terminals are shown, the communications system 100 may further include, for example, a core network device or a device configured to carry a virtualized network function in addition to the network devices and the terminals. These are obvious to a person of ordinary skill in the art, and details are not described herein.

For easy understanding of the embodiments of this application, before the data transmission method in the embodiments of this application is described, a mapping relationship between a codeword, a layer, and an antenna port, and a concept of quasi-co-location (QCL) are briefly described.

Before reaching a physical layer and being sent through an air interface, user plane data and a signaling message need to be processed by a packet data convergence protocol (PDCP)/radio link control (RLC)/media access control (MAC) layer. Data processed at the physical layer is a protocol data unit (PDU), namely, a data stream, at the MAC layer. A data stream from an upper layer becomes a codeword after channel coding. Different data streams are differentiated by different codewords. Because a quantity of codewords is not consistent with a quantity of transmit antennas, the codewords may be mapped to different transmit antennas. Therefore, layer mapping and precoding need to be performed. The layer mapping may be understood as remapping codewords to a plurality of layers according to a specific rule. The precoding may be understood as mapping data mapped to the plurality of layers to different antenna ports.

A network device encodes data to obtain a codeword, maps the codeword to a layer, maps the codeword to an antenna port, sends the codeword to a terminal through a corresponding antenna port, and sends a demodulation reference signal through a corresponding antenna port. To enable the terminal to correctly demodulate received data, the network device further needs to indicate, to the terminal by using DCI, information such as a quantity of layers, a codeword, and an antenna port that correspond to the data carried in a physical downlink shared channel (for example, a PDSCH, Physical Downlink Shared Channel in the LTE). By detecting a corresponding indication field in the DCI, the terminal may obtain information such as a quantity of layers included in the data received by the terminal and an antenna port number corresponding to each layer. The terminal demodulates the received data based on the demodulation reference signal to obtain the original data.

It should be understood that there is a mapping relationship between a codeword and an antenna port. The terminal may determine the antenna port based on the codeword, or may determine the codeword based on the antenna port.

The antenna ports may be understood as different logical ports defined to distinguish between different channels. A channel through which a signal sent on an antenna port passes may be determined based on a channel through which another signal sent on the same antenna port passes. For example, the terminal may demodulate data based on a demodulation reference signal such as a DMRS sent on a same antenna port used for sending the data. The "antenna port number" described in this application is used to indicate a specific antenna port, for example, an antenna port number 7 indicates an antenna port 7.

To support the CoMP, a concept of quasi-co-location (QCL) of antenna ports is introduced in the LTE. The concept of quasi-co-location (QCL) of antenna ports is defined as that signals sent from quasi-co-located antenna ports may undergo same large-scale fading, and the large-scale fading includes a delay spread, a Doppler spread, a Doppler frequency shift, an average channel gain, and an average delay. In the current technology, to support the terminal in receiving downlink control information from the service network device through a PDCCH, and receiving downlink data from the coordinated network device through a PDSCH, a new transmission mode, namely, a transmission mode 10, is defined in Release 11. In the transmission mode 10, a physical downlink shared channel resource element mapping and quasi-co-location indicator (PQI) in the DCI is mainly introduced to indicate a network device from which the downlink data is sent and a group of antenna ports (the antenna port herein mainly refers to a channel state information-reference signal (CSI-RS) port, but this is not limited in this application) that is consistent with a large-scale channel property corresponding to the downlink data. The UE may learn, based on the PQI with reference to a PDSCH mapping message element configured by using radio resource control (RRC) signaling, that a radio channel parameter corresponding to which group of antenna ports needs to be used to demodulate the downlink data.

In spatial multiplexing of the LTE, all DMRS ports (7 to 14) corresponding to the PDSCH received by the terminal are QCL, to be specific, an antenna port 7 to an antenna port 7 are quasi-co-located, and a demodulation pilot directly corresponds to the quantity of layers.

In an existing protocol, two types of QCL configuration (a type-A and a type-B) are defined in the TM 10. The type-A defines a QCL configuration of a station (TRP), to be specific, antenna ports (including a common reference signal (common reference signal, CRS), a DMRS, and a CSI-RS) of the station meet QCL. The type-B defines QCL configurations between a plurality of stations, and the QCL configurations between the plurality of stations may be indicated by using the PQI (2 bits) in the DCI. Therefore, when a single station or a single network device serves the terminal, the terminal can determine, based on an existing DCI structure, a PDSCH resource scheduled by the network device, and may determine QCL configuration information corresponding to the resource, so that more accurate channel estimation and data demodulation can be performed.

As shown in FIG. 1, the network device 20 and the network device 22 are located at different locations, and do not meet a quasi-co-location requirement. If an antenna port set (or referred to as a group of antenna ports) corresponding to a demodulation reference signal of the network device 20 is A1, and an antenna port set corresponding to a demodulation reference signal of the network device 22 is A2, different antenna ports in A1 and A2 cannot simultaneously send data to the terminal 20. Therefore, antenna ports belonging to different sets do not meet the quasi-co-location requirement. Only an antenna port existing in both A1 and A2 may send data through a single frequency network (SFN). In this case, data sent by same antenna ports in the network device 20 and the network device 22 is required to be totally the same. Alternatively, in general, the network device 20 serves the terminal 40, and the network device 22 serves the terminal 42.

In non-coherent JT (NCJT) transmission, because the network device 20 and the network device 22 may transmit different data streams to the terminal 20 on a same time-frequency resource or different time-frequency resources, the antenna port set A1 and a CSI-RS port (for example, denoted as an antenna port A11) on the network device 20 are QCL, and the antenna port set A2 and a CSI-RS port (for example, denoted as an antenna port A22) on the network device 22 are QCL. However, the antenna port set A1 and the antenna port set A1 are non-QCL.

Therefore, when a plurality of network devices perform scheduling by using one piece of DCI, the terminal needs to know a group of PDSCH resources scheduled by each network device, and in addition, the terminal further needs to know QCL configuration information corresponding to each group of PDSCH resources. In this way, the terminal can correctly demodulate data of each network device.

To resolve the foregoing two problems, this application provides two data transmission methods to resolve the foregoing problems respectively. It should be understood that the two data transmission methods provided in the embodiments of this application may be used in combination.

The following explains some general concepts or definitions in the embodiments of this application or possible implementations that may be applied to some or all of the embodiments. It should be noted that some English abbreviations in the LTE system are used as examples in this specification to describe the embodiments of this application, and the English abbreviations may change with network evolution. For specific evolution, refer to descriptions in corresponding standards.

A higher layer in this application may be a media access control MAC (MAC) layer, a radio link control (RLC) layer, a packet data convergence protocol (PDCP) layer, and the like other than a physical layer.

Higher layer signaling in this application may be another signaling such as RRC signaling and media access control control element (MAC CE) signaling.

"Scheduled resources", "resources", and the like described in this application are physical downlink shared channel (PDSCH) resources.

The term "and/or" in this application describes only an association relationship of associated objects and represents that three relationships may exist. For example, "A and/or B" may represent the following three cases: Only A exists, both A and B exist, and only B exists. In addition, the character "/" in this specification usually indicates an "or" relationship between the associated objects.

In addition, it may be understood that the terms "first" and "second" in this application are merely for ease of description and understanding, and shall not constitute any limitation on the embodiments of this application.

Figure 2:
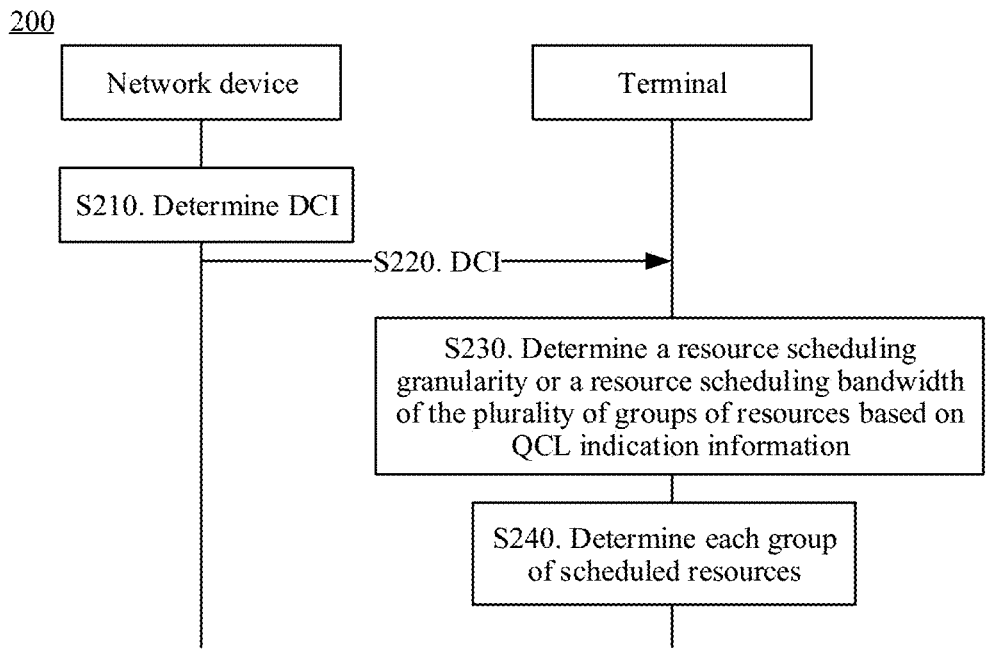
FIG. 2 is a schematic flowchart of a data transmission method according to this application.

The following describes in detail the data transmission method of the embodiments of this application with reference to FIG. 2.

It should be understood that FIG. 2 is a schematic flowchart of a data transmission method according to an embodiment of this application, and shows specific communication steps or operations of the method. However, these steps or operations are merely examples, and another operation or transformations of various operations in FIG. 2 may be further performed in the embodiment of this application. In addition, the steps in FIG. 2 may be performed in a sequence different from that shown in FIG. 2, and not all operations in FIG. 2 need to be performed.

FIG. 2 is a schematic flowchart of a data transmission method 200 according to an embodiment of this application from a perspective of device interaction.

S210. A network device determines downlink control information (DCI).

The DCI is used to indicate a plurality of groups of scheduled resources, and the plurality of groups of resources may be totally the same, or may be totally different or partially the same. In other words, the plurality of groups of resources may be orthogonal in time domain and/or frequency domain, or may be totally overlapped in time domain and frequency domain, or may be partially overlapped in time domain and/or frequency domain. In the following, for ease of understanding and description, the plurality of groups of scheduled resources are denoted as a resource group #1 to a resource group #N, and N is an integer greater than or equal to 1. A resource group #i∈E [1, N], and i is an integer) is used to indicate any one of the at least one group of resources.

The plurality of groups of resources one-to-one correspond to a plurality of groups of antenna ports, or the plurality of groups of resources one-to-one correspond to a plurality of groups of codewords. In the following, for ease of understanding and description, the plurality of groups of antenna ports are denoted as an antenna port group #1 to an antenna port group #N, and the plurality of groups of codewords are denoted as a codeword group #1 to a codeword group #N, where N≥1. The codeword group #1 to the codeword group #N are different from each other. Correspondences between the resource groups #1 to #N and the antenna port groups #1 to #N may be that, for example, the resource group #1 is resources of the antenna port group #1, a resource group #2 is resources of an antenna port group #2, and by analogy, the resource group #N is resources of the antenna port group #N. Correspondences between the resource groups #1 to #N and the codeword groups #1 to #N may be that, for example, the resource group #1 corresponds to the codeword group #1, the resource group #2 corresponds to a codeword group #2, and by analogy, the resource group #N corresponds to the codeword group #N.

Optionally, the antenna port groups #1 to #N may correspond to the codeword groups #1 to #N. For example, the antenna port groups #1 to #N one-to-one correspond to the codeword groups #1 to #N. For example, the antenna port group #1 corresponds to the codeword group #1, the antenna port group #2 corresponds to the codeword group #2, and by analogy, the antenna port group #N corresponds to the codeword group #N.

Optionally, the antenna port groups #1 to #N may be DMRS antenna ports. Each group of codewords in a codeword group #i includes at least one codeword. Each of the antenna port groups #1 to #N includes at least one antenna port, and all antenna ports in an antenna port group #i meet QCL. An antenna port in a group of antenna ports and an antenna port in another group of antenna ports are non-QCL.

A person skilled in the art may understand that the one-to-one correspondence between the resource groups #1 to #N and the codeword groups #1 to #N, or the one-to-one correspondence between the resource groups #1 to #N and the antenna port groups #1 to #N may mean that the resource groups #1 to #N one-to-one correspond to a network device #1 to a network device #N. For example, the resource group #1 is a group of resources scheduled by the network device #1, the resource group #2 is a group of resources scheduled by a network device #2, and by analogy, the resource group

N is a group of resources scheduled by the network device #N. For brevity, detailed descriptions thereof are omitted herein.

Optionally, in an embodiment of this application, the plurality of groups of scheduled resources may be indicated by using bit information in an RA field in the DCI. The RA field is a resource block assignment field in the DCI in an LTE protocol. In this way, the RA field indicates the plurality of groups of scheduled resources, to reduce signaling overheads.

Optionally, in an embodiment of this application, an RA field in DCI in an existing protocol may be expanded to indicate the N groups of scheduled resources.

Figure 3:
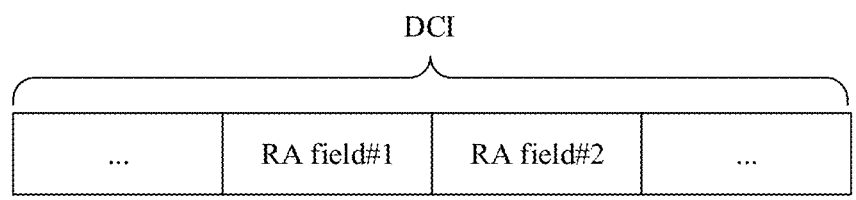
FIG. 3 is a schematic diagram of a DCI format obtained after an RA field is expanded according to an embodiment of this application.

For example, when M=2, the DCI may include two RA fields (for example, which are denoted as an RA field #1 and an RA field #2). A DCI format obtained after the RA field is expanded may be, for example, a form shown in FIG. 3. One RA field is used to indicate one group of scheduled resources.

It should be understood that the DCI format is not limited in this embodiment of this application. For example, the DCI format may be a DCI format 2D or a DCI format 2A.

Optionally, the network device may be a service network device of a terminal. In addition, the network device may further be a coordinated network device of the terminal. This is not specifically limited in the embodiment of this application.

S220. The network device sends the DCI to the terminal. Correspondingly, the terminal receives the DCI.

S230. The terminal determines a first scheduling unit or a resource scheduling bandwidth of the plurality of groups of resources based on QCL indication information.

Optionally, the QCL indication information may be used to determine whether a current transmission manner is NCJT. A quantity of network devices using the NCJT may be predefined by a system.

Further, the QCL indication information may be used to determine a quantity of the network devices participating in the NCJT (in other words, a quantity N of antenna port groups meeting the non-QCL).

Therefore, the terminal can determine the first scheduling unit or the resource scheduling bandwidth based on the current transmission manner or based on the quantity of the network devices participating in the NCJT (in other words, the quantity N of the antenna port groups meeting the non-QCL).

S240. The terminal determines the plurality of groups of resources based on the DCI and the first scheduling unit, or based on the DCI and the resource scheduling bandwidth.

Therefore, according to the method in this embodiment of this application, the terminal can determine, based on the QCL indication information, antenna port groups respectively corresponding to the resource groups #1 to #N, so that when receiving data, the terminal can demodulate the data based on a correspondence between a resource and an antenna port.

To enable a person skilled in the art to better understand this application, the following first briefly describes an RA field in DCI in the prior art.

For example, a DCI format is the DCI format 2D. An RA field in DCI with the format 2D supports two resource assignment manners: a type 0 and a type 1. The type 0 indicates resource scheduling that is in a form of consecutive RBGs. The type 1 may indicate, by using resource grouping, a shift indicator, and an RB indicator, resource scheduling that is at a granularity of an RB.

First, a concept of the RBG is described.

The RBG is a group of consecutive localized virtual resource blocks (VRB). An RBG size (P, to be specific, a quantity of VRBs included in each RBG, and a quantity of VRBs included in a last RBG may be less than P) is related to a (downlink) system bandwidth. A correspondence is shown in Table 1.

TABLE 1

| Downlink system bandwidth $N_{RB}^{DL}$ | RBG size (P) |
|---|---|
| ≤10 | 1 |
| 11-26 | 2 |
| 27-63 | 3 |
| 64-110 | 4 |

A total quantity $N_{RBG}$ of RBGs corresponding to the downlink system bandwidth $N_{RB}^{DL}$ is:

$$N_{RBG} = \lceil N_{RB}^{DL}/P \rceil$$

Sizes of the first $\lfloor N_{RB}^{DL}/P \rfloor$ RBGs are P. If $N_{RBG}$% p>0, a size of the last RBG is $N_{RB}^{DL} - P \cdot \lfloor N_{RB}^{DL}/P \rfloor$. RBG indexes start at a lowest frequency and are numbered in ascending order of frequencies. ⌈ ⌉ represents rounding up.

In an example in which the downlink system bandwidth is $N_{RB}^{DL}=50$ RB, it can be learned by searching Table 1 that a value of P corresponding to the downlink system bandwidth is 3. The total quantity $N_{RBG}$ of the RBGs is 17. Each of the first 16 RBGs includes three VRBs, and the last RBG includes only two VRBs.

(I) Resource Assignment Type 0

When a resource assignment manner used in the RA field of the DCI is the type 0, a bitmap of the RA field is used to indicate RBGs assigned to UE. The bitmap includes $\lceil N_{RB}^{DL}/P \rceil$ bits (in other words, a size of the RA field) in total. Each bit corresponds to one RBG. A leftmost bit represents an RBG 0, a rightmost bit represents an RBG $N_{RBG}-1$, and so on. If an RBG is assigned to the terminal, a corresponding bit in the bitmap is set to 1; otherwise, the bit is set to 0.

For example, a downlink system bandwidth is 25 RBs.

(1) It may be learned by searching Table 1 that an RBG size is P=2.

(2) A total quantity of RBGs is $N_{RBG} = \lceil N_{RB}^{DL}/P \rceil = \lceil 25/2 \rceil = 13$ As shown in (a) in FIG. 4, a size of each of the first 12 RBGs is 2, and a size of the last RBG is 1.

(3) The bitmap of the RA field includes 13 bits in total.

(4) If the bitmap includes 13 bits in total, and the bitmap of the RA field is 1001110100010, resources assigned to the terminal are an RBG 0, an RBG 3, an RBG 4, an RBG 5, an RBG 7, and an RBG 11 (as shown in (b) in FIG. 4).

(II) Resource Assignment Type 1

When a resource assignment manner used in the RA field of the DCI is the type 1, all RBGs are divided into P subsets, and P is an RBG size. Each RBG subset p(0≤p<p) includes all RBGs starting from an RBG p at intervals of P. VRB resources assigned to a terminal need to come from a same subset.

In the resource assignment type 1, three fields (the three fields are collectively referred to as the RA field) indicate VRBs assigned to the terminal.

The first field includes $\lceil \log_2(P) \rceil$ bits, and is used to specify a selected RBG subset, namely, a value of p.

The second field includes one bit (shift bit), and is used to specify whether a resource in a subset shifts, where 1 indicates that the resource shifts, and 0 indicates that the resource does not shift.

The third field includes a bitmap, and each bit in the bitmap corresponds to one VRB in the selected RBG subset. A leftmost bit represents the first VRB in the subset, a rightmost bit represents the last VRB in the subset, and so on. If a VRB is assigned to a terminal, a corresponding bit in the bitmap is set to 1; otherwise, the bit is set to 0. A size of the bitmap, in other words, a quantity $N_{RB}^{TYPE1}$ of bits included in the bitmap is:

$$N_{RB}^{TYPE1} = \lceil N_{RB}^{DL}/P \rceil - \lceil \log_2(P) \rceil - 1$$

A starting VRB in the selected RBG subset is a minimum VRB number in the subset+a shift $\Delta_{shift}(p)$, and corresponds to the leftmost bit in the bitmap. The shift is represented as a quantity of VRBs and occurs in the selected RBG subset. If the second field in resource block assignment information of the DCI is 0, a shift of the RBG subset p is $\Delta_{shift}(p)=0$, If the second field in the resource block assignment information of the DCI is 1, the shift of the RBG subset p is $\Delta_{shift}(p) = N_{RB}^{RBG\ subset}(p) - N_{RB}^{TYPE1}$, and the rightmost bit in the bitmap is adjusted to represent the last VRB in the RBG subset.

$N_{RB}^{RBG\ subset}(p)$ is a quantity of VRBs included in the RBG subset p, and is calculated according to the following calculation formula:

$$N_{RB}^{RBGsubset}(p) = \begin{cases} \left\lfloor \frac{N_{RB}^{DL}-1}{P^2} \right\rfloor \cdot P + P, & p < \left\lfloor \frac{N_{RB}^{DL}-1}{P} \right\rfloor \bmod P \\ \left\lfloor \frac{N_{RB}^{DL}-1}{P^2} \right\rfloor \cdot P + (N_{RB}^{DL}-1)\bmod P + 1, & p = \left\lfloor \frac{N_{RB}^{DL}-1}{P} \right\rfloor \bmod P \\ \left\lfloor \frac{N_{RB}^{DL}-1}{P^2} \right\rfloor \cdot P, & p > \left\lfloor \frac{N_{RB}^{DL}-1}{P} \right\rfloor \bmod P \end{cases}$$

For the RBG subset p, a VRB corresponding to each bit i (i=0,1, . . . $N_{RB}^{TYPE1}-1$) in the bitmap of the RBG subset p may be calculated according to the following formula:

$$n_{VRB}^{RBGsubset}(p) = \left\lfloor \frac{i + \Delta_{shift}(p)}{P} \right\rfloor P^2 + p \cdot P + (i + \Delta_{shift}(p)) \bmod P$$

The following describes the resource assignment type 1 more specifically by using an example in which a cell downlink system bandwidth is 25 RBs.

(1) It may be learned by searching Table 1 that P=2, in other words, there are two subsets: a subset 0 (starting from an RBG 0) and a subset 1 (starting from an RBG 1). An interval between RBGs in each subset is P=2. In this case, RBG sets included in the subset 0 and the subset 1 are shown in Table 2.

TABLE 2

| Subset 0 (p = 0) | RBG 0 | RBG 2 | RBG 4 | RBG 6 | RBG 8 | RBG 10 | RBG 12 |
|---|---|---|---|---|---|---|---|
| Subset 1 (p = 1) | RBG 1 | RBG 3 | RBG 5 | RBG 7 | RBG 9 | RBG 11 | |

(2) $\lceil \log_2(P) \rceil = 1$ means that the selected RBG subset is specified by using one bit in the first field.

(3) Whether a resource in the RBG subset shifts is specified by using one bit in the second field.

(4) A quantity of bits included in the bitmap is $N_{RB}^{TYPE1} = \lceil N_{RB}^{DL}/P \rceil - \lceil \log_2(P) \rceil - 1 = 13 - 1 - 1 = 11$. In other words, the bitmap can correspond only to 11 VRBs.

(5) A quantity of VRBs included in each RBG subset p is shown in Table 3.

TABLE 3

| | |
|---|---|
| $N_{RB}^{RBG\ subset}(0)$ | 13 |
| $N_{RB}^{RBG\ subset}(1)$ | 12 |

It can be learned that the bitmap cannot represent all VRBs included in each subset.

(6) The following describes the second field in detail, to be specific, an effect of the shift bit on VRBs represented by the bitmap.

If the shift bit is 0, the shift of the RBG subset p is $\Delta_{shift}(p)=0$; and if the shift bit is 1, the shift of the RBG subset p is shown in Table 4:

TABLE 4

| | |
|---|---|
| $\Delta_{shift}(0)$ | 2 (13-11) |
| $\Delta_{shift}(1)$ | 1 (12-11) |

It can be learned from the foregoing analysis that RBGs included in each subset are determined, in other words, included VRBs are also determined. Corresponding to Table 2, a VRB set available to each subset is shown in FIG. 5.

When the shift bit is 0, it can be learned, according to the following formula, a VRB corresponding to each bit of the bitmap (for the 25-RB bandwidth, there are 11 bits in total):

$$n_{VRB}^{RBGsubset}(p) = \left\lfloor \frac{i + \Delta_{shift}(p)}{P} \right\rfloor P^2 + p \cdot P + (i + \Delta_{shift}(p)) \bmod P$$

Results are shown in Table 5.

TABLE 5

| i | VRBs (Subset 0) | VRBs (Subset 1) |
|---|---|---|
| 0 | 0 | 2 |
| 1 | 1 | 3 |
| 2 | 4 | 6 |
| 3 | 5 | 7 |
| 4 | 8 | 10 |
| 5 | 9 | 11 |
| 6 | 12 | 14 |
| 7 | 13 | 15 |
| 8 | 16 | 18 |
| 9 | 17 | 19 |
| 10 | 20 | 22 |

It can be learned from Table 5 that if the shift bit is 0 (no shift occurs), VRBs corresponding to a bitmap of each subset are 11 VRBs that are sequentially selected and start from the first VRB (a starting VRB corresponding to the subset 0 is the VRB 0, and a starting VRB corresponding to the subset 1 is the VRB 2) in the given VRB set in FIG. 5.

When the shift bit is 1, it can be learned, according to the following formula, a VRB corresponding to each bit of the bitmap (for the 25-RB bandwidth, there are 11 bits in total):

$$n_{VRB}^{RBGsubset}(p) = \left\lfloor \frac{i + \Delta_{shift}(p)}{P} \right\rfloor P^2 + p \cdot P + (i + \Delta_{shift}(p)) \bmod P$$

Results are shown in Table 6.

TABLE 6

| i | VRBs (Subset 0) | VRBs (Subset 1) |
|---|---|---|
| 0 | 4 | 3 |
| 1 | 5 | 6 |
| 2 | 8 | 7 |
| 3 | 9 | 10 |
| 4 | 12 | 11 |
| 5 | 13 | 14 |
| 6 | 16 | 15 |
| 7 | 17 | 18 |
| 8 | 20 | 19 |
| 9 | 21 | 22 |
| 10 | 24 | 23 |

Figures 4A, 4B:
FIG. 4(a) and FIG. 4(b) are a schematic diagram of a system resource and a scheduled resource according to an embodiment of this application.

It can be learned from Table 6 that if the shift bit is 1 (a shift occurs), the VRBs corresponding to the bitmap of each subset are 11 VRBs that are sequentially selected and start from the first VRB in the given VRB set in FIG. 5 plus a shift (a shift of the subset 0 is $\Delta_{shift}^{(0)}=2$, to be specific, in the given VRB set with p=0 in FIG. 5, a starting VRB is a VRB 4 by moving forward two VRBs; and a shift of the subset 1 is $\Delta_{shift}(1)=1$, to be specific, in the given VRB set with p=1 in FIG. 4(a) and FIG. 4(b), a starting VRB is a VRB 3 by moving forward one VRB).

An example in which the cell downlink system bandwidth is 25 RBs, and the resource assignment type 1 is used is as follows:

For the subset 0, the shift bit is 0, and the bitmap is 10011101000. To be specific, resources assigned to the UE are a VRB 0, a VRB 5, a VRB 8, a VRB 9, and a VRB 13.

For the subset 0, the shift bit is 1, and the bitmap is 10011101000. To be specific, resources assigned to the UE are: a VRB 4, a VRB 9, a VRB 12, a VRB 13, and a VRB 17.

The following describes in detail, with reference to the foregoing described type 0 and type 1 in the DCI format 2D, several possible implementations used to implement S230 in this application. With reference to the possible implementations, a process of determining the plurality of resources by the terminal is described in detail. Optionally, another resource assignment type in the 5G system or a future communications system is applicable to this application. This is not limited in this application.

Manner 1

The terminal may determine, based on the QCL indication information, that a size Pj of the first scheduling unit is N times that of a second scheduling unit.

Optionally, the second scheduling unit may be a resource block group (RBG), a resource block (RB), or another predefined scheduling granularity.

It should be understood that the second scheduling unit is not specifically limited in this embodiment of this application, and the second scheduling unit may also be a scheduling unit specified in NR.

Optionally, in this embodiment of this application, the network device may configure the size Pj of the first scheduling unit by using higher layer signaling. In addition, the terminal may also determine the first scheduling unit based on the quantity of the network devices participating in the NCJT.

The following describes two methods for implementing the manner 1.

(1)

The RA field is an RA field in an existing DCI format, to be specific, an existing DCI structure is not changed.

It may be learned from the foregoing descriptions that, after a DCI format and a resource assignment manner (for example, the type 0 and the type 1) used by the RA field are determined, a quantity of bits (or referred to as bits) occupied by the RA field may be determined based on a downlink system bandwidth by searching Table 1. The following describes this embodiment of this application in detail with reference to the resource assignment type 0 and the resource assignment type 1.

1. The resource assignment type 0

A bitmap of the RA field is still $N_{RBG}=\lceil N_{RB}^{DL}/P \rceil$ bits.

In an example of a 25-RB downlink system bandwidth, the terminal may learn by searching Table 1 that, an RBG size is P=2 and a total quantity of RBGs is $N_{RBG}=\lceil N_{RB}^{DL}/P \rceil=\lceil 25/2 \rceil=13$, and it may be determined that the bitmap of the RA field includes 13 bits in total.

In the current technology, when a resource assignment type is the resource assignment type 0, the second scheduling unit is an RBG. According to the method in this embodiment of this application, when a resource assignment type is the resource assignment type 0, it may be determined that the first scheduling unit is two RBGs. If two consecutive RBGs are assigned, a corresponding bit in the bitmap is set to 1; otherwise, the bit is set to 0.

N=2 is used as an example. A half of bits of the bitmap in the RA field may represent resources assigned on a full bandwidth.

In this embodiment of this application, the following may be specified by higher layer configuration or predefinition in a protocol.

When $N_{RBG}=\lceil N_{RB}^{DL}/P \rceil$ is an even number, the first half of bits of the RA field are resource scheduling information of a first network device (for example, corresponding to a resource group #1), and the second half of bits represent resource scheduling information of a second network device (for example, corresponding to a resource group #2). In other words, the resource group #1 may be determined based on the first half of bits of the RA field, and the resource group #2 may be determined based on the second half of bits of the RA field. Alternatively, it may be specified that in this case, the first half of bits of the RA field are resource scheduling information of a second network device (for example, corresponding to a resource group #2), and the second half of bits represent resource scheduling information of a first network device (for example, corresponding to a resource group #1). This is not limited in the embodiment of this application.

When $N_{RBG}=\lceil N_{RB}^{DL}/P \rceil$ is an odd number, the following formulas can be used.

A quantity of bits assigned to resources of a first network device are the first $N_{RBG}=\lceil N_{RB}^{DL}/2P \rceil$ or $N_{RBG}=\lceil \lceil N_{RB}^{DL}/P \rceil/2 \rceil$, and a quantity of bits assigned to resources of the second network device are a quantity of remaining bits.

In this case, each network device can assign resources on the full bandwidth. Compared with the current technology, a size of a scheduling unit doubles in this case.

For example, the bitmap of the RA field includes 13 bits in total: 1001110100010. After it is determined that the first scheduling unit is two RBGs, the following may be determined:

When the first $\lceil N_{RB}^{DL}/2P \rceil$ bits of the RA field indicate the resource group #1, the resource group #1 includes an RBG 0, an RBG 1, an RBG 6, an RBG 7, an RBG 8, an RBG 9, an RBG 10, and an RBG 11. The resource group #2 includes an RBG 0, an RBG 1, an RBG 8, and an RBG 9.

It should be understood that, if N=3, a quantity of bits occupied by each network device may be assigned by using a method similar to the foregoing method, so that the first $\lceil N_{RB}^{DL}/3P \rceil$ bits of the RA field may indicate a resource group #1, the middle $\lceil N_{RB}^{DL}/3P \rceil$ bits indicate a resource group #2, and the remaining bits indicate a resource group #3. Alternatively, the first $\lceil N_{RB}^{DL}/3P \rceil$ bits of the RA field may indicate a resource group #1, the middle $\lceil N_{RB}^{DL}/3P \rceil$ bits indicate a resource group #2, and the remaining bits indicate a resource group #3. Bits in the RA field may alternatively be divided in another manner, and a specific division manner is not limited in this embodiment of this application. It should be further understood that, when N is another value, the bit division manner of the RA field may refer to the foregoing example. A specific division manner is not limited in this embodiment of this application.

2. The resource assignment type 1.

A bitmap of the RA field is still $N_{RB}^{TYPE1} = \lceil N_{RB}^{DL}/P \rceil - \lceil \log_2(P) \rceil - 1$ bits.

The 25-RB downlink system bandwidth in the resource assignment type 1 described in the foregoing is used as an example. A quantity of bits included in the bitmap is $N_{RB}^{TYPE1} = \lceil N_{RB}^{DL}/P \rceil - \lceil \log_2(P) \rceil - 1 = 13 - 1 = 11$, in other words, the bitmap corresponds to 11 VRBs.

In the current technology, when a resource assignment type is the resource assignment type 1, the second scheduling unit is an RB. According to the method in this embodiment of this application, in an example of N=2, when a resource assignment type is the resource assignment type 1, it may be determined that the first scheduling unit is two RBs.

In this case, a half of bits of the bitmap in the RA field may represent resources assigned on a full bandwidth.

Optionally, in this embodiment of this application, the following may be specified by higher layer signaling configuration or predefinition in a protocol.

When $N_{RB}^{TYPE1}$ is an even number, the first half of bits of the bitmap in the RA field indicate resources scheduled by a first network device (for example, corresponding to a resource group #1), and the second half of bits represent resources scheduled by a second network device (for example, corresponding to a resource group #2). In other words, the resource group #1 may be determined based on the first half of bits of the bitmap of the RA field, and the resource group #2 may be determined based on the second half of bits of the RA field. Alternatively, it may be specified that in this case, the first half of bits of the bitmap of the RA field are resource scheduling information of a second network device (for example, corresponding to a resource group #2), and the second half of bits represent resource scheduling information of a first network device (for example, corresponding to a resource group #1). This is not limited in the embodiment of this application.

When $N_{RB}^{TYPE1}$ is an odd number, the following formulas can be used.

A quantity of bits used to indicate resources scheduled by the first network device is first $N_{RBG} = \lceil N_{RB}^{TYPE1}/2P \rceil$ or $N_{RBG} = \lceil \lceil N_{RB}^{TYPE1}/P \rceil/2 \rceil$, and a quantity of bits used to indicate resources scheduled by the second network device is a quantity of remaining bits.

In this case, each network device can assign resources on the full bandwidth. Compared with the current technology, a size of a scheduling unit doubles in this case.

When the first $N_{RBG} = \lceil N_{RB}^{TYPE1}/2P \rceil$ bits of the bitmap indicate the resource group #1, for example, resources assigned to the terminal are a subset 0, a shift bit is 0, and a bitmap is 10011101000. After it is determined that the first scheduling unit is two RBs, it may be determined that the resource group #1 includes a VRB 0, a VRB 1, a VRB 12, a VRB 13, a VRB 16, a VRB 17, and a VRB 20, and the resource group #2 includes a VRB 6 and a VRB 7.

For example, resources assigned to the terminal are a subset 0, a shift bit is 1, and a bitmap is 10011101000. After it is determined that the first scheduling unit is two RBs, it may be determined that the resource group #1 includes a VRB 4, a VRB 5, a VRB 16, a VRB 17, a VRB 20, a VRB 21, and a VRB 24, and the resource group #2 includes a VRB 8 and a VRB 9.

It should be understood that, if N=3, a quantity of bits occupied by each network device may be assigned by using a method similar to the foregoing method, so that the first $\lceil N_{RB}^{TYPE1}/3P \rceil$ bits of the bitmap may indicate a resource group #1, the middle $\lceil N_{RB}^{TYPE1}/3P \rceil$ bits indicate a resource group #2, and the remaining bits indicate a resource group #3. Alternatively, the first $\lceil N_{RB}^{TYPE1}/3P \rceil$ bits of the bitmap may indicate a resource group #1, the middle $\lceil N_{RB}^{TYPE1}/3P \rceil$ bits indicate a resource group #2, and the remaining bits indicate a resource group #3. Bits in the bitmap may alternatively be divided in another manner, and a specific division manner is not limited in this embodiment of this application. It should be further understood that, when N is another value, the bit division manner of the bitmap may refer to the foregoing example. A specific division manner is not limited in this embodiment of this application.

(2)

The RA field in the DCI in the existing protocol is expanded to indicate the N groups of scheduled resources. For example, in this case, the RA field may be in the form shown in FIG. 3. It should be noted that bits of a bitmap of each expanded RA field are different from bits in the current technology.

1. The Resource Assignment Type 0

The bitmap of each RA field is $N_{RBG} = \lceil N_{RB}^{DL}/(N*Pj) \rceil$ bits.

In the current technology, when a resource assignment type is the resource assignment type 0, the first scheduling unit is an RBG. According to the method in this embodiment of this application, when a resource assignment type is the resource assignment type 0, it may be determined that a size Pj of the first scheduling unit is two RBGs. If two consecutive RBGs are assigned, a corresponding bit in the bitmap is set to 1; otherwise, the bit is set to 0.

In this case, the bitmap of each RA field may represent resources assigned on a full bandwidth. In other words, each network device can assign resources on the full bandwidth. Compared with the current technology, the size of the first scheduling unit doubles in this case.

In an example of the 25-RB system bandwidth and N=2, bitmaps of a first RA field and a second RA field both include $N_{RBG} = \lceil N_{RB}^{DL}/P \rceil = \lceil 25/4 \rceil = 7$ bits. Each of the first six bits indicates two RBGs, and the last bit indicates one RBG.

For example, a bitmap of the first RA field (for example, an RA field #1) includes seven bits in total: 1001110, and a bitmap of the second RA field (for example, an RA field #2) includes seven bits in total: 1000101. It may be determined that: when the RA field #1 indicates a resource group #1, and the RA field #2 indicates a resource group #2, the resource group #1 includes an RBG 0, an RBG 1, an RBG 6, an RBG 7, an RBG 8, an RBG 9, an RBG 10, and an RBG 11, and the resource group #2 includes an RBG 0, an RBG 1, an RBG 8, an RBG 9, an RBG 12, and an RBG 13.

2. The Resource Assignment Type 1

In the current technology, when a resource assignment type is the resource assignment type 1, the first scheduling unit is an RB. According to the method in the embodiment of this application, when a resource assignment type is the resource assignment type 1, it may be determined that the size Pj of the first scheduling unit is two RBs.

In this case, the bitmap of each RA field may represent resources assigned on a full bandwidth. In other words, each network device can assign resources on the full bandwidth. Compared with the current technology, a size of a scheduling unit doubles in this case.

The bitmap of each RA field is $N_{RB}^{TYPE1}=\lceil(\lceil N_{RB}^{DL}/P\rceil-\lceil\log_2(P)\rceil-1)/2\rceil$ bits.

In an example of the 25-RB system bandwidth and N=2, a first bitmap and a second bitmap both include $N_{RB}^{TYPE1}=\lceil(\lceil N_{RB}^{DL}/P\rceil-\lceil\log_2(P)\rceil-1)/2\rceil$ bits in total. Each of the first five bits indicates two RBs, and the last bit indicates one RB.

For example, resources assigned to the terminal are a subset 0, and a shift bit is 0. A bitmap of a first RA field (for example, an RA field #1) includes six bits in total: 100111. A bitmap of a second RA field (for example, an RA field #2) includes six bits in total: 100010. After it is determined that the first scheduling unit is 2 RBs, it may be determined that a resource group #1 includes a VRB 0, a VRB 1, and a VRB 12 to a VRB 20, and a resource group #2 includes a VRB 2, a VRB 3, a VRB 18, and a VRB 19.

For example, resources assigned to the terminal are a subset 0, and a shift bit is 1. A bitmap of a first RA field (for example, an RA field #1) includes six bits in total: 100111. A bitmap of a second RA field (for example, an RA field #2) includes six bits in total: 100010. After it is determined that the first scheduling unit is 2 RBs, it may be determined that a resource group #1 includes a VRB 4, a VRB 5, and a VRB 16 to a VRB 24, and a resource group #2 includes a VRB 3, a VRB 6, a VRB 19, and a VRB 22.

Manner 2

The terminal may determine, based on the QCL indication information, that the resource scheduling bandwidth $N_{TRP}$ is $\lceil N_{RB}^{DL}/N\rceil$, and $N_{RB}^{DL}$ is a downlink system bandwidth or a bandwidth part (bandwidth part). To be specific, a resource scheduling bandwidth of each network device is $\lceil N_{RB}^{DL}/N\rceil$.

Optionally, when the QCL indication information is used to indicate that the current transmission manner is the NCJT, the resource scheduling bandwidth $\lceil N_{RB}^{DL}/N\rceil$ may be configured by the network device by using higher layer signaling. When the QCL indication information is used to indicate the quantity of the network devices participating in the NCJT, the terminal device may determine the resource scheduling bandwidth $N_{TRP}$ based on the quantity N of the network devices participating in the NCJT. Alternatively, a value of N may be predefined, for example, N is predefined as 2. A specific value is not limited herein.

The following describes two methods for implementing the manner 2.

(1)

The RA field is an RA field in an existing DCI format, to be specific, an existing DCI structure is not changed.

1. The Resource Assignment Type 0

A bitmap of the RA field is still $N_{RBG}=\lceil N_{RB}^{DL}/P\rceil$ bits.

Optionally, the first $N_{RBG}=\lceil N_{TRP}/P\rceil$ bits of the bitmap are used to indicate resources scheduled by a first network device (for example, corresponding to a resource group #1), and the remaining bits of the bitmap are used to indicate resources scheduled by a second network device (for example, corresponding to a resource group #2). In other words, the resource group #1 may be determined based on the first $N_{RBG}=\lceil N_{TRP}/P\rceil$ bits of the bitmap, and the resource group #2 may be determined based on the remaining bits of the bitmap.

In an example of the 25-RB downlink system bandwidth, when N=2, it may be determined that the resource scheduling bandwidth is 13 RBs.

It is assumed that the bitmap of the RA field includes 13 bits in total: 1001110100010. After it is determined that the resource scheduling bandwidth is 13 RBs, it may be determined that: the resource group #1 includes an RBG 0, an RBG 3, an RBG 4, and an RBG 5; and the resource group #2 includes an RBG 7 and an RBG 11.

It should be understood that, in this embodiment of this application, only the foregoing bitmap division manner of the RA field is used as an example. The bitmap division manner of the RA field is not limited in this application, and another similar bitmap division manner of the RA field should fall within the protection scope of this application.

2. The Resource Assignment Type 1

A bitmap of the RA field is still $N_{RB}^{TYPE1}=\lceil N_{RB}^{DL}/P\rceil-\lceil\log_2(P)\rceil-1$ bits.

Optionally, the first $N_{RB}^{TYPE1}=\lceil N_{TRP}/P\rceil$ bits of the bitmap are used to indicate resources scheduled by a first network device (for example, corresponding to a resource group #1), and the remaining bits of the bitmap are used to indicate resources scheduled by a second network device (for example, corresponding to a resource group #2). In other words, the resource group #1 may be determined based on the first $N_{RB}^{TYPE1}=\lceil N_{TRP}/P\rceil$ bits of the bitmap, and the resource group #2 may be determined based on the remaining bits of the bitmap.

In an example of the 25-RB downlink system bandwidth, when N=2, it may be determined that the resource scheduling bandwidth is 13 RBs at the maximum.

The 25-RB downlink system bandwidth in the resource assignment type 1 described in the foregoing is used as an example. A quantity of bits included in the bitmap is $N_{RB}^{TYPE1}=\lceil N_{RB}^{DL}/P\rceil-\lceil\log_2(P)\rceil-1=13-1-1=11$, in other words, the bitmap corresponds to 11 VRBs.

For example, resources assigned to the terminal are a subset 0, a shift bit is 0, and a bitmap is 10011101000. After it is determined that the resource scheduling bandwidth is 13 RBs, it may be determined that the resource group #1 includes a VRB 0, a VRB 5, a VRB 8, and a VRB 9, and the resource group #2 includes a VRB 13.

For example, resources assigned to the terminal are a subset 0, a shift bit is 1, and a bitmap is 10011101000. After it is determined that the resource scheduling bandwidth is 13 RBs, it may be determined that the resource group #1 includes a VRB 4, a VRB 9, a VRB 12, and a VRB 13, and the resource group #2 includes a VRB 17.

(2) The RA field in the DCI in the existing protocol is expanded to indicate the N groups of scheduled resources. For example, in this case, the RA field may be in the form shown in FIG. 3. It should be noted that bits of a bitmap of each expanded RA field are different from bits in the current technology.

In an example of the 25-RB downlink system bandwidth, when N=2, it may be determined that the resource scheduling bandwidth is 13 RBs at the maximum.

1. The Resource Assignment Type 0

A bitmap of each RA field is $N_{RBG}=\lceil N_{TRP}/P\rceil$ bits.

For example, a bitmap of a first RA field (for example, an RA field #1) includes seven bits in total: 1001110, and a bitmap of a second RA field (for example, an RA field #2)

includes seven bits in total: 1000100. It may be determined that when the RA field #1 indicates a resource group #1, and the RA field #2 indicates a resource group #2, the resource group #1 includes an RBG 0, an RBG 3, an RBG 4, and an RBG 5, and the resource group #2 includes an RBG 0 and an RBG 4.

2. The Resource Assignment Type 1

A size bitmap of an RA field is $N_{RB}^{TYPE1}=\lceil N_{TRP}/P \rceil$ bits.

For example, resources assigned to the terminal are a subset 0, and a shift bit is 0. A bitmap of a first RA field (for example, an RA field #1) includes six bits in total: 100111. A bitmap of a second RA field (for example, an RA field #2) includes six bits in total: 100010. After it is determined that the resource scheduling bandwidth is 13 RBs at the maximum, it may be determined that a resource group #1 includes a VRB 0, a VRB 5, a VRB 8, and a VRB 9, and a resource group #2 includes a VRB 12 and a VRB 20.

For example, resources assigned to the terminal are a subset 0, and a shift bit is 1. A bitmap of a first RA field (for example, an RA field #1) includes six bits in total: 100111. A bitmap of a second RA field (for example, an RA field #2) includes six bits in total: 100010. After it is determined that the resource scheduling bandwidth is 13 RBs at the maximum, it may be determined that a resource group #1 includes a VRB 4, a VRB 9, a VRB 12, and a VRB 13, and a resource group #2 includes a VRB 16 and a VRB 21.

In summary, the terminal may determine the resource groups #1 to #N.

It should be understood that only the type 0 and the type 1 are used as examples in the foregoing descriptions. A resource assignment type is not limited in this application. For example, the resource assignment type may be a type 2 or another resource assignment type.

Optionally, in another embodiment of the QCL indication information, the QCL indication information may be used to indicate QCL configuration information of the plurality of groups of antenna ports corresponding to the plurality of groups of codewords, or the QCL indication information is used to indicate the plurality of groups of antenna ports and QCL configuration information of the plurality of groups of antenna ports. In other words, the QCL indication information is used to indicate the QCL configuration information of the antenna port groups #1 to #N corresponding to the codeword groups #1 to #N, or the QCL indication information is used to indicate the antenna port groups #1 to #N and the QCL configuration information of the antenna port groups #1 to #N. For ease of understanding and description, the QCL configuration information indicated by the QCL indication information is denoted as a QCL configuration information group #1 to a QCL configuration information group #N. The QCL configuration information groups #1 to #N are different from each other. Optionally, each two of an antenna port group, a codeword group, and a QCL configuration information group are in a one-to-one correspondence. For example, the QCL configuration information group #1 corresponds to the antenna port group #1, and a QCL configuration information group #2 corresponds to the antenna port group #2, and by analogy, the QCL configuration information group #N corresponds to the antenna port group #N. Alternatively, the QCL configuration information group #1 corresponds to the codeword group #1, a QCL configuration information group #2 corresponds to the codeword group #2, and by analogy, the QCL configuration information group #N corresponds to the codeword group #N. To avoid repetition, detailed descriptions thereof are omitted herein. The QCL configuration information is used to determine a QCL relationship between antenna ports. A QCL configuration information group #i is used as an example, and an antenna port (for example, a CSI-RS antenna port) that meets QCL with the antenna port group #i can be determined based on the QCL configuration information group #i, so that the terminal device demodulates data based on the QCL configuration information. For example, the antenna port group #i (corresponding to the codeword group #i) includes an antenna port 7 and an antenna port 8. The QCL configuration information group #i may indicate that an antenna port 15 meets the QCL with the antenna port 7 and the antenna port 8, in other words, the antenna port 7, the antenna port 8, and the antenna port 15 are QCL.

Optionally, the QCL configuration information is used to indicate a group of higher layer parameters. For example, the QCL configuration information may be an index of a group of higher layer parameters. The index of the group of higher layer parameters is used to indicate the group of higher layer parameters. The higher layer parameter may be understood as a parameter that is configured by a higher layer and delivered by using RRC signaling. The higher layer parameter may include at least one of the following content:

1. a CRS antenna port (crs-PortsCount-r11);
2. a CRS frequency shift (crs-FreqShift-r11);
3. a subframe configuration (mbsfn-SubframeConfigList-r11) of a multimedia broadcast multicast service single frequency network (MBSFN);
4. a zero power CSI-RS configuration (csi-RS-ConfigZPId-r11);
5. a starting position of a PDSCH (pdsch-Start-r11); and
6. a quasi-co-located non-zero power CSI-RS configuration (qcl-CSI-RS-ConfigNZPId-r11).

Values of parameters in parameter sets configured by different higher layers are not totally the same.

It should be understood that, in this embodiment of this application, a parameter set configured by a higher layer may further include another parameter, and is not limited to the foregoing listed parameters.

Optionally, the QCL indication information may be carried in the DCI, and further, may be carried in a PQI field.

Therefore, according to the method in this embodiment of this application, the terminal can determine, based on the QCL indication information, the antenna port groups respectively corresponding to the resource groups #1 to #N, so that when receiving data, the terminal can demodulate the data based on the correspondence between a resource and an antenna port.

It should be understood only rounding up is used as examples in the calculation formulas related to the invention points in this application. In specific implementation, calculation may be performed in another manner such as rounding down. This is not limited in this application.

Figure 6:
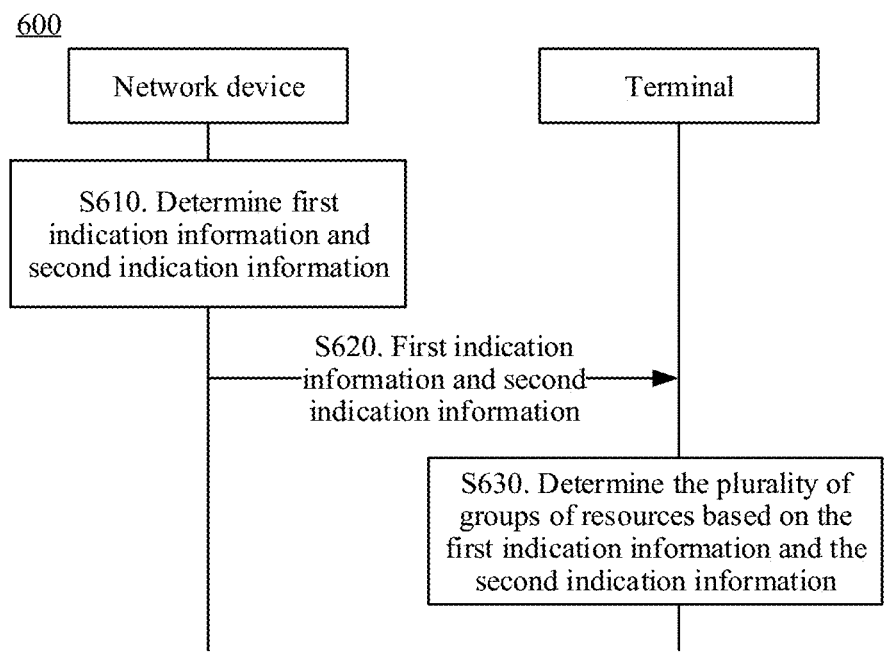
FIG. 6 is a schematic flowchart of a data transmission method according to another embodiment of this application.

FIG. 6 is a schematic flowchart of a data transmission method 600 according to another embodiment of this application.

S610. A network device determines first indication information and second indication information.

The first indication information is used to indicate at least one group of scheduled resources. In the following, for ease of understanding and description, the at least one group of scheduled resources is denoted as a resource group #1 to a resource group #M, where M≥1. A resource group #i (i∈[1, M], and i is an integer) is used to indicate any one of the at least one group of resources. The following other information is represented by using a similar method. The resource groups #1 to #M may be all the same, or may be different from each other, or may be partially the same. The resource groups #1 to #M one-to-one correspond to at least one group of antenna ports, or the resource groups #1 to #M one-to-one correspond to at least one group of codewords. All groups of codewords may be the same, or may be different. All groups of antenna ports may be the same, or may be different. In the following, for ease of understanding and description, the at least one group of antenna ports is denoted as an antenna port group #1 to an antenna port group #M, and the at least one group of codewords is denoted as a codeword group #1 to a codeword group #M, where M≥1. Correspondences between the resource groups #1 to #M and the antenna port groups #1 to #M may be that, for example, the resource group #1 is resources of the antenna port group #1, a resource group #2 is resources of an antenna port group #2, and by analogy, the resource group #M is resources of the antenna port group #M. Correspondences between the resource groups #1 to #M and the codeword groups #1 to #M may be that, for example, the resource group #1 corresponds to the codeword group #1, the resource group #2 corresponds to a codeword group #2, and by analogy, the resource group #M corresponds to the codeword group #M. Optionally, the antenna port groups #1 to #M one-to-one correspond to the codeword groups #1 to #M. For example, the antenna port group #1 corresponds to the codeword group #1, the antenna port group #2 corresponds to the codeword group #2, and by analogy, the antenna port group #M corresponds to the codeword group #M. It should be further understood that the antenna groups #1 to #M are all DMRS antenna ports. Each of the antenna port groups #1 to #M includes at least one antenna port, and all antenna ports in an antenna port group #i meet QCL. An antenna port in a group of antenna ports and an antenna port in another group of antenna ports are non-QCL.

A person skilled in the art may understand that the one-to-one correspondence between the resource groups #1 to #M and the codeword groups #1 to #M, or the one-to-one correspondence between resource groups #1 to #M and the antenna port groups #1 to #M may mean that the resource groups #1 to #M one-to-one correspond to a network device #1 to a network device #M. For example, the resource group #1 is a group of resources scheduled by a network device #1, the resource group #2 is a group of resources scheduled by a network device #2, and by analogy, the resource group #M is a group of resources scheduled by the network device #M. For brevity, detailed descriptions thereof are omitted herein.

The second indication information is used to indicate quasi-co-location (QCL) configuration information of the at least one group of antenna ports corresponding to the at least one group of codewords.

Further, the second indication information is further used to indicate the at least one group of codewords or the at least one group of antenna ports. In other words, the second indication information is used to indicate the codeword groups #1 to #M and QCL configuration information of the antenna port groups #1 to #M, or the second indication information is used to indicate the antenna port groups #1 to #M and QCL configuration information of the antenna port groups #1 to #M.

In the following, for ease of understanding and description, the QCL configuration information indicated by the second indication information is denoted as a QCL configuration information group #1 to a QCL configuration information group #M. The QCL configuration information groups #1 to #M may be the same, or may be different from each other. Optionally, each two of an antenna port group, a codeword group, and a QCL configuration information group are in a one-to-one correspondence. For example, the QCL configuration information group #1 corresponds to the antenna port group #1, a QCL configuration information group #2 corresponds to the antenna port group #2, and by analogy, the QCL configuration information group #M corresponds to the antenna port group #M. Alternatively, the QCL configuration information group #1 corresponds to the codeword group #1, a QCL configuration information group #2 corresponds to the codeword group #2, and by analogy, the QCL configuration information group #M corresponds to the codeword group #M. To avoid repetition, detailed descriptions thereof are omitted herein. The QCL configuration information is used to determine a QCL relationship between antenna ports. A QCL configuration information group #i is used as an example, and an antenna port (for example, a CSI-RS antenna port) that meets QCL with the antenna port group #i can be determined based on the QCL configuration information group #i, so that a terminal device demodulates data based on the QCL configuration information. For example, the antenna port group #i (corresponding to a codeword group #i) includes an antenna port 7 and an antenna port 8. The QCL configuration information group #i may indicate that an antenna port 15 meets the QCL with the antenna port 7 and the antenna port 8, in other words, the antenna port 7, the antenna port 8, and the antenna port 15 are QCL.

Optionally, the QCL configuration information may be used to indicate a group of higher layer parameters. For example, the QCL configuration information may be an index of a group of higher layer parameters. The higher layer parameter may be understood as a parameter that is configured by a higher layer and delivered by using RRC signaling. For content included in the higher layer parameter, refer to the foregoing descriptions. For brevity, details are not described herein again.

Optionally, the network device may be a service network device of a terminal. In addition, the network device may further be a coordinated network device of the terminal. This is not specifically limited in the embodiment of this application.

S620. The network device sends the first indication information and the second indication information to the terminal. Correspondingly, the terminal receives the first indication information and the second indication information.

Optionally, the network device may send the first indication information and the second indication information to the terminal by sending DCI. To be specific, the first indication information and the second indication information may be carried in the DCI.

A DCI format is not limited in this embodiment of this application. For example, the DCI format may be a DCI format 2D or a DCI format 2A, or may be another DCI format in a future 5G communications system.

Optionally, the network device may send the first indication information to the terminal based on the DCI, and send the second indication information to the terminal by using higher layer signaling.

Optionally, the first indication information may be information in an RA field in the DCI.

Therefore, the network device may indicate a plurality of groups of resources by using one RA field, so that signaling overheads can be reduced while a requirement that a plurality of network devices each need to schedule resources is met.

Optionally, the second indication information may be information in a PQI field in the DCI.

Signaling overheads can be further reduced by carrying the second information in the PQI field in the DCI.

For example, the second information may be any one of "00", "01", "10", or "11" in Table 7.

TABLE 7

| PQI | Description |
|---|---|
| 00 | CW1 or DMRS group 1: a parameter set 1 configured by a higher layer or (CW2 or DMRS group 1: a parameter set 1 configured by a higher layer) |
| 01 | CW1 or DMRS group 2: a parameter set 2 configured by a higher layer or (CW2 or DMRS group 2: a parameter set 2 configured by a higher layer) |
| 10 | CW1 or DMRS group 3: a parameter set 3 configured by a higher layer<br>CW2 or DMRS group 4: a parameter set 4 configured by a higher layer |
| 11 | CW1 or DMRS group 5: a parameter set 5 configured by a higher layer<br>CW2 or DMRS group 6: a parameter set 6 configured by a higher layer |

The CW1 represents one group of codewords, and the CW2 represents another group of codewords. The DMRS group 1 to the DMRS group 6 may represent an antenna port group #1 to an antenna port group #6 respectively.

In this embodiment of this application, when being "00" or "01", the second indication information may be used to indicate a group of information, to be specific, indicate a codeword group #1 and a corresponding QCL configuration information group #1, or may be used to indicate an antenna port group #1 and a corresponding QCL configuration information group #1. When being "11", the second indication information may be used to indicate two groups of different information, to be specific, indicate a codeword group #3/an antenna port group #3 and a corresponding QCL configuration information group #3, and a codeword group #4/an antenna port group #4 and a corresponding QCL configuration information group #4.

S630. The terminal determines the at least one group of resources based on the first indication information and the second indication information.

Specifically, according to the descriptions in S610, the terminal may determine, based on the second indication information, the resource groups #1 to #N in the first indication information that one-to-one correspond to the antenna port groups #1 to #M.

According to the data transmission method in this embodiment of this application, all groups of resources can be determined based on the first indication information and the second indication information, and a requirement of scheduling a plurality of TPs or resources of a plurality of groups of non-QCL antenna ports by the network device can be met.

Optionally, in a possible implementation of S630, the terminal may determine a first scheduling unit of the at least one group of resources based on the QCL configuration information indicated by the second indication information.

Specifically, after determining the first scheduling unit based on the QCL configuration information indicated by the second indication information, the terminal can determine a decipher manner of the first indication information, so as to determine the resource groups #1 to #N. For example, assuming N=2, and the first indication information is in an RA field in the DCI format 2D, when the QCL configuration information indicated by the second indication information is two different groups of QCL configuration information, the terminal may determine that the first scheduling unit is two RBGs. If a bitmap in the RA field occupies 10 bits, the terminal may determine that resources indicated by the first five bits of the bitmap in the RA field belong to a resource group #1, and resources indicated by the last five bits belong to a resource group #2. Alternatively, when the QCL configuration information indicated by the second indication information is two same groups of QCL configuration information or only one group of QCL configuration information, the terminal may determine that the first scheduling unit is an RBG. The terminal may determine that resources indicated by the RA field belong to both a resource group #1 and a resource group #2, in other words, the resource group #1 and the resource group #2 are totally overlapped.

Further, the terminal may determine the first scheduling unit based on a quantity k of groups of the QCL configuration information indicated by the second indication information. All groups of QCL configuration information are different. In other words, the terminal determines the first scheduling unit based on a quantity of different QCL configuration information groups in the QCL configuration information indicated by the second indication information. For details, refer to the foregoing descriptions of the manner 1. When the manner 1 is applied to this method, k=N.

Optionally, in a possible implementation of S630, the terminal may determine a resource scheduling bandwidth of the at least one group of resources based on the QCL configuration information indicated by the second indication information.

Specifically, after determining the resource scheduling bandwidth based on the QCL configuration information indicated by the second indication information, the terminal can determine the decipher manner of the first indication information, so as to determine the resource groups #1 to #N. For example, assuming N=2, and the first indication information is the information in an RA field in the DCI format 2D, when the QCL configuration information indicated by the second indication information is two different groups of QCL configuration information, the terminal may determine that the resource scheduling bandwidth is $[N_{RB}^{DL}/2]$, and $N_{RB}^{DL}$ is a downlink system bandwidth. If a bitmap in the RA field occupies 10 bits, the terminal may determine that resources indicated by the first five bits of the bitmap in the RA field belong to a resource group #1, and resources indicated by the last five bits belong to a resource group #2. Alternatively, when the QCL configuration information indicated by the second indication information is two same groups of QCL configuration information, the terminal may determine that the resource scheduling bandwidth is $N_{RB}^{DL}$. The terminal may determine that resources indicated by the RA field belong to both a resource group #1 and a resource group #2, in other words, the resource group #1 and the resource group #2 are totally overlapped.

Further, the terminal may determine the resource scheduling bandwidth based on a quantity k of groups of the QCL configuration information indicated by the second indication information. All the groups of QCL configuration information are different. In other words, the terminal determines the resource scheduling bandwidth based on a quantity of different QCL configuration information groups in the QCL configuration information indicated by the second indication information. For details, refer to the foregoing descriptions of the manner 2. When the manner 2 is applied to this method, k=N.

It should be understood that the k groups of the QCL configuration information are different from each other, which means that parameters included in each group of QCL configuration information are of a same category, but values of parameters of a same parameter category in each group of QCL parameters are different.

Optionally, that the terminal determines the resource scheduling bandwidth based on the QCL configuration information indicated by the second indication information includes:

When the QCL configuration information indicated by the second indication information is first QCL configuration information, the terminal determines that the resource scheduling bandwidth is the downlink system bandwidth $N_{RB}^{DL}$; and when the k groups of the QCL configuration information indicated by the second indication information are second QCL configuration information, the terminal determines that the resource scheduling bandwidth is $\lceil N_{RB}^{DL}/k \rceil$, where k is an integer greater than or equal to 1.

For example, when the first QCL configuration information is two groups of same QCL configuration information, it is determined that the resource scheduling bandwidth is the downlink system bandwidth $N_{RB}^{DL}$. In another case, the terminal determines that the resource scheduling bandwidth is $\lceil N_{RB}^{DL}/k \rceil$.

It should be understood that the first QCL configuration information is specified, for example, preset in a system. The first QCL configuration information may include one or more groups of QCL configuration information. The second QCL configuration information may be QCL configuration information other than the first QCL configuration information.

Figure 7:
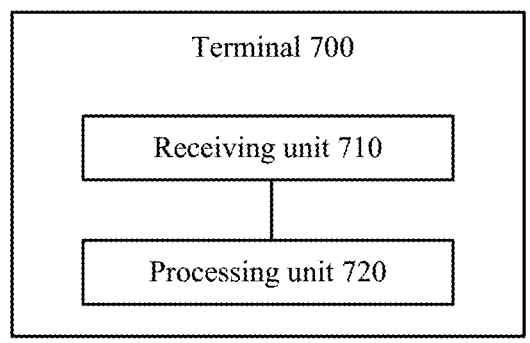
FIG. 7 is a schematic block diagram of a terminal according to this application.

FIG. 7 is a schematic block diagram of a terminal according to an embodiment of this application. As shown in FIG. 7, the terminal 700 includes a receiving unit 710 and a processing unit 720.

The receiving unit 710 is configured to receive first indication information and second indication information. The first indication information is used to indicate at least one group of resources, and the at least one group of resources corresponds to at least one group of antenna ports or at least one group of codewords. Each group of antenna ports includes at least one antenna port. The second indication information is used to indicate quasi-co-location (QCL) configuration information of the at least one group of antenna ports corresponding to the at least one group of codewords. One group of antenna ports or one group of codewords corresponds to one group of QCL configuration information, and the QCL configuration information is used to determine a QCL relationship between antenna ports.

The processing unit 720 is configured to determine the at least one group of resources based on the first indication information and the second indication information.

Alternatively, the receiving unit 710 is configured to send downlink control information (DCI). The DCI is used to indicate a plurality of groups of resources. The plurality of groups of resources one-to-one correspond to a plurality of groups of antenna ports or a plurality of groups of codewords, and each group of antenna ports includes at least one antenna port.

The processing unit 720 is configured to determine a first scheduling unit or a resource scheduling bandwidth of the plurality of groups of resources, and determine the plurality of groups of resources based on the DCI and the first scheduling unit. Alternatively, the terminal determines the plurality of groups of resources based on the DCI and the first scheduling unit.

It should be understood that units in the terminal 700 may be configured to respectively perform actions or processing processes of the terminal in the foregoing method embodiments. To avoid repetition, detailed descriptions thereof are omitted herein.

Figure 8:
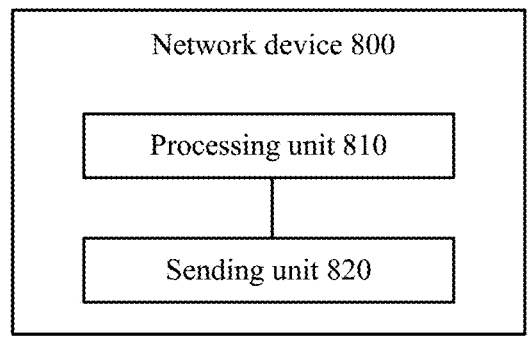
FIG. 8 is a schematic block diagram of a network device according to this application.

FIG. 8 is a schematic block diagram of a network device according to an embodiment of this application. As shown in FIG. 8, the network device 800 includes a processing unit 810 and a sending unit 820.

The processing unit 810 is configured to determine first indication information and second indication information. The first indication information is used to indicate at least one group of resources, and the at least one group of resources corresponds to at least one group of antenna ports or at least one group of codewords. Each group of antenna ports includes at least one antenna port. The second indication information is used to indicate quasi-co-location (QCL) configuration information of the at least one group of antenna ports corresponding to the at least one group of codewords. One group of antenna ports or one group of codewords corresponds to one group of QCL configuration information, and the QCL configuration information is used to determine a QCL relationship between antenna ports.

The sending unit 820 is configured to send the first indication information and the second indication information to a terminal.

Alternatively, the processing unit Bio is configured to determine, based on a first scheduling unit or a resource scheduling bandwidth of a plurality of groups of resources, the plurality of groups of resources. The plurality of groups of resources one-to-one correspond to a plurality of groups of antenna ports or a plurality of groups of codewords, and each group of antenna ports includes at least one antenna port.

The sending unit 820 is configured to send downlink control information (DCI) to the terminal, and the DCI is used by the terminal to determine the plurality of groups of resources.

It should be understood that units in the network device 800 may be configured to respectively perform actions or processing processes of the network device 900 in the foregoing method embodiments. To avoid repetition, detailed descriptions thereof are omitted herein.

Figure 9:
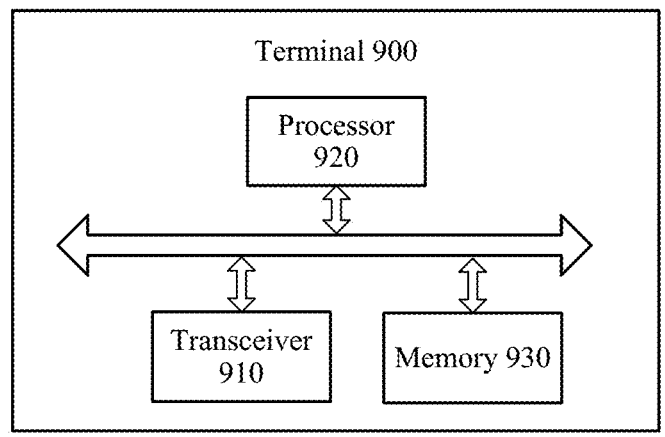
FIG. 9 is a schematic block diagram of another terminal according to this application.

FIG. 9 is a schematic structural diagram of a terminal 900 according to an embodiment of this application. As shown in FIG. 9, the terminal 900 includes a transceiver 910, a processor 920, and a memory 930. The transceiver 910, the processor 920, and the memory 930 communicate with each other through an internal connection channel, to transmit a control signal and/or a data signal.

It should be understood that the transceiver 910 may correspond to the receiving unit 710 in the terminal 700, and the processor 920 corresponds to the processing unit 720 in the terminal 700. In addition, the transceiver 910 may be configured to implement a function of the receiving unit 710, and the processor 920 is configured to implement a function of the processing unit 720. To avoid repetition, detailed descriptions thereof are omitted herein.

It should be further understood that, when invoking and running a computer program in the memory, the processor 920 may be configured to perform the foregoing method and implement a function of an execution body of the method, for example, a terminal.

Figure 10:
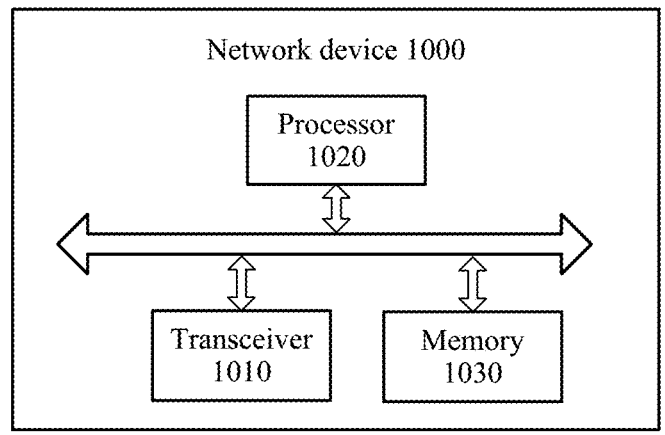
FIG. 10 is a schematic block diagram of another network device according to this application.

FIG. 10 is a schematic structural diagram of a network device 1000 according to an embodiment of this application. As shown in the FIG. 10, the network device 1000 includes a transceiver 1010, a processor 1020, and a memory 1030. The transceiver 1010, the processor 1020, and the memory 1030 communicate with each other through an internal connection channel, to transmit a control signal and/or a data signal.

It should be understood that the transceiver 1010 may correspond to the sending unit 820 in the network device 800, and the processor 1020 corresponds to the processing unit 810 in the network device. In addition, the transceiver 1010 may be configured to implement a function of the sending unit 820, and the processor 1020 is configured to implement a function of the processing unit 810. To avoid repetition, detailed descriptions thereof are omitted herein.

It should be further understood that, when invoking and running a computer program in the memory, the processor 1020 may be configured to perform the foregoing method and implement a function of an execution body of the method, for example, a network device.

The embodiment of this application may be applied to a processor, or implemented by a processor. The processor may be an integrated circuit chip and has a signal processing capability. In an implementation process, steps in the foregoing method embodiments can be implemented by using a hardware integrated logic circuit in the processor, or by using an instruction in a form of software. The foregoing processor may be a central processing unit (CPU). The processor may alternatively be another general-purpose processor, a digital signal processor (DSP), an application-specific integrated circuit (ASIC), a field programmable gate array (FPGA) or another programmable logical device, a discrete gate or a transistor logic device, or a discrete hardware component. The processor may implement or perform the methods, steps, and logical block diagrams disclosed in the embodiments of this application. The general-purpose processor may be a microprocessor, or the processor may be any conventional processor or the like. The steps of the methods disclosed with reference to the embodiments of this application may be directly performed by a hardware decoding processor, or may be performed by using a combination of hardware and software in the decoding processor. Software may be located in a mature storage medium in the art, such as a random access memory, a flash memory, a read-only memory, a programmable read-only memory, an electrically erasable programmable memory, or a register. The storage medium is located in a memory, and a processor reads information in the memory and completes the steps in the foregoing methods in combination with hardware of the processor.

It should be further understood that the memory in the embodiments of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limited description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DRRAM). It should be noted that the memory of the systems and methods described in this specification includes but is not limited to these and any memory of another proper type.

It should be understood that the term "and/or" in this specification describes only an association relationship of associated objects and represents that three relationships may exist. For example, "A and/or B" may represent the following three cases: Only A exists, both A and B exist, and only B exists. In addition, the character "/" in this specification usually indicates an "or" relationship between the associated objects.

It should be understood that sequence numbers of the foregoing processes do not mean execution sequences in the embodiments of this application. The execution sequences of the processes should be determined based on functions and internal logic of the processes, and shall not constitute any limitation on the implementation processes of the embodiments of this application.

A person of ordinary skill in the art may be aware that, in combination with the embodiments disclosed in this specification, the described units and algorithm steps in the examples may be implemented by electronic hardware, computer software, or a combination thereof. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in another manner. For example, the described apparatus embodiments are merely examples. For example, unit division is merely logical function division and may be another division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electronic form, a mechanical form, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
receiving, by a terminal, first indication information and second indication information, wherein the first indication information indicates a group of resources, the group of resources corresponds to a group of antenna ports or a group of codewords, the group of antenna ports corresponds to the group of codewords, each group of antenna ports of a plurality of groups of antenna ports corresponding to a network device comprises at least one antenna port, the second indication information indicates quasi-co-location (QCL) configuration information of the group of antenna ports that corresponds to the group of codewords, groups of antenna ports of the plurality of groups of antenna ports have a one to one correspondence to groups of QCL information of a plurality of groups of QCL information, or groups of codewords of a plurality of groups of codewords have a one to one correspondence with the groups of QCL information of the plurality of groups of QCL information, and the QCL configuration information is usable to determine a QCL relationship between different antenna ports; and
determining, by the terminal, the group of resources based on the first indication information and the second indication information.

2. The method according to claim 1, wherein determining, by the terminal, the group of resources based on the first indication information and the second indication information comprises:
determining, by the terminal, a first scheduling unit of the group of resources based on the QCL configuration information indicated by the second indication information; and
determining, by the terminal, the group of resources based on the first scheduling unit and the first indication information.

3. The method according to claim 2, wherein determining, by the terminal, the first scheduling unit of the group of resources based on the QCL configuration information indicated by the second indication information comprises:
determining, by the terminal based on a quantity k of groups of the QCL configuration information indicated by the second indication information, that the first scheduling unit is k times a second scheduling unit, wherein k is an integer greater than or equal to 1, and the k groups of the QCL configuration information are different from each other.

4. The method according to claim 3, wherein the second scheduling unit is a resource block group (RBG) or a resource block (RB).

5. The method according to claim 1, wherein determining, by the terminal, the group of resources based on the first indication information and the second indication information comprises:
determining, by the terminal, a resource scheduling bandwidth of the group of resources based on the QCL configuration information indicated by the second indication information; and
determining, by the terminal, the group of resources based on the resource scheduling bandwidth and the first indication information.

6. The method according to claim 5, wherein determining, by the terminal, the resource scheduling bandwidth of the group of resources based on the QCL configuration information indicated by the second indication information comprises:
determining, by the terminal based on a quantity k of groups of the QCL configuration information indicated by the second indication information, that the resource scheduling bandwidth is $\lceil N_{RB}^{DL}/k \rceil$, wherein $N_{RB}^{DL}$ is a downlink system bandwidth or a bandwidth part bandwidth part, k is an integer greater than or equal to 1, and the k groups of the QCL configuration information are different from each other.

7. The method according to claim 1, wherein receiving, by the terminal, the first indication information and the second indication information comprises:
receiving, by the terminal, downlink control information (DCI), wherein the DCI comprises the first indication information and the second indication information.

8. A terminal, comprising:
a receiver;
a processor; and
a non-transitory computer-readable storage medium storing a program to be executed by the processor, the program including instructions for:
receiving, using the receiver, first indication information and second indication information, wherein the first indication information indicates a group of resources, the group of resources corresponds to a group of antenna ports or a group of codewords, the group of antenna ports corresponds to the group of codewords, each group of antenna ports of a plurality of groups of antenna ports corresponding to a network device comprises at least one antenna port, the second indication information indicates quasi-co-location (QCL) configuration information of the group of antenna ports corresponding to the group of codewords, groups of antenna ports of the plurality of groups of antenna ports have a one to one correspondence to groups of QCL information of a plurality of groups of QCL information, or groups of codewords of a plurality of groups of codewords have a one to one correspondence with the groups of QCL information of the plurality of groups of QCL information, and the QCL configuration information is usable to determine a QCL relationship between different antenna ports; and
determining the group of resources based on the first indication information and the second indication information.

9. The terminal according to claim 8, wherein the program includes instructions for:
determining a first scheduling unit of the group of resources based on the QCL configuration information indicated by the second indication information; and
determining the group of resources based on the first scheduling unit and the first indication information.

10. The terminal according to claim 9, wherein the program includes instructions for:
determining, based on a quantity k of groups of the QCL configuration information indicated by the second indication information, that the first scheduling unit is k times a second scheduling unit, wherein k is an integer greater than or equal to 1, and the k groups of the QCL configuration information are different from each other.

11. The terminal according to claim 10, wherein the second scheduling unit is a resource block group (RBG) or a resource block (RB).

12. The terminal according to claim 8, wherein the program includes instructions for:
determining a resource scheduling bandwidth of the group of resources based on the QCL configuration information indicated by the second indication information; and
determining the group of resources based on the resource scheduling bandwidth and the first indication information.

13. The terminal according to claim 12, wherein the program includes instructions for:
determining, based on a quantity k of groups of the QCL configuration information indicated by the second indication information, that the resource scheduling bandwidth is $\lceil N_{RB}^{DL}/k \rceil$, wherein $N_{RB}^{DL}$ is a downlink system bandwidth or a bandwidth part bandwidth part, k is an integer greater than or equal to 1, and the k groups of the QCL configuration information are different from each other.

14. The terminal according to claim 8, wherein the program includes instructions for:
receiving, using the receiver, downlink control information (DCI), wherein the DCI comprises the first indication information and the second indication information.

15. A network device, comprising:
a transmitter;
a processor; and
a non-transitory computer-readable storage medium storing a program to be executed by the processor, the program including instructions for:
determining first indication information and second indication information, wherein the first indication information indicates a group of resources, the group of resources corresponds to a group of antenna ports or a group of codewords, the group of antenna ports corresponds to the group of codewords, each group of antenna ports of a plurality of groups of antenna ports corresponding to the network device comprises at least one antenna port, the second indication information indicates quasi-co-location (QCL) configuration information of the group of antenna ports corresponding to the group of codewords, groups of antenna ports of the plurality of groups of antenna ports have a one to one correspondence to groups of QCL information of a plurality of groups of QCL information, or groups of codewords of a plurality of groups of codewords have a one to one correspondence with the groups of QCL information of the plurality of groups of QCL information, and the QCL configuration information is usable to determine a QCL relationship between different antenna ports; and
sending, using the transmitter, the first indication information and the second indication information to a terminal.

16. The network device according to claim 15, wherein the QCL configuration information indicated by the second indication information is usable to determine a first scheduling unit of the group of resources, and the first scheduling unit is usable to determine the group of resources.

17. The network device according to claim 16, wherein the first scheduling unit is k times a second scheduling unit, k is a quantity of groups of the QCL configuration information indicated by the second indication information, k is an integer greater than or equal to 1, and the k groups of the QCL configuration information are different from each other.

18. The network device according to claim 17, wherein the second scheduling unit is a resource block group (RBG) or a resource block (RB).

19. The network device according to claim 15, wherein the QCL configuration information indicated by the second indication information is usable to determine a resource scheduling bandwidth of the group of resources, and the resource scheduling bandwidth is usable to determine the group of resources.

20. The network device according to claim 19, wherein the resource scheduling bandwidth is $\lceil N_{RB}^{DL}/k \rceil$, $N_{RB}^{DL}$ is a downlink system bandwidth or a bandwidth part bandwidth part, k is a quantity of groups of the QCL configuration information indicated by the second indication information, k is an integer greater than or equal to 1, and the k groups of the QCL configuration information are different from each other.

* * * * *